(12) United States Patent
Schwartz

(10) Patent No.: US 10,291,885 B2
(45) Date of Patent: May 14, 2019

(54) RETRIEVING DEVICE

(71) Applicant: Eric D. Schwartz, Palm Beach Gardens, FL (US)

(72) Inventor: Eric D. Schwartz, Palm Beach Gardens, FL (US)

( * ) Notice: Subject to any disclaimer, the term of this patent is extended or adjusted under 35 U.S.C. 154(b) by 0 days.

(21) Appl. No.: 14/976,803

(22) Filed: Dec. 21, 2015

(65) Prior Publication Data

US 2016/0105647 A1 Apr. 14, 2016

Related U.S. Application Data

(63) Continuation of application No. 13/430,165, filed on Mar. 26, 2012, now Pat. No. 9,216,323.

(60) Provisional application No. 61/467,484, filed on Mar. 25, 2011.

(51) Int. Cl.
| | |
|---|---|
| *H04N 7/18* | (2006.01) |
| *H04N 9/04* | (2006.01) |
| *A63B 47/02* | (2006.01) |
| *A63B 24/00* | (2006.01) |
| *H04N 5/225* | (2006.01) |

(52) U.S. Cl.
CPC ............ *H04N 7/183* (2013.01); *A63B 47/02* (2013.01); *H04N 9/04* (2013.01); *A63B 2024/0053* (2013.01); *H04N 2005/2255* (2013.01)

(58) Field of Classification Search
None
See application file for complete search history.

(56) References Cited

U.S. PATENT DOCUMENTS

| | | | | |
|---|---|---|---|---|
| 5,132,622 | A * | 7/1992 | Valentino | A63B 24/0021 324/326 |
| 5,716,390 | A | 2/1998 | Li | |
| 5,836,869 | A * | 11/1998 | Kudo | A61B 1/00039 600/102 |
| 5,928,137 | A | 7/1999 | Green | |
| 2002/0141812 | A1 | 10/2002 | Edelen et al. | |
| 2006/0158549 | A1 | 7/2006 | Digweed et al. | |
| 2008/0205875 | A1* | 8/2008 | Barabe | G02B 23/24 396/420 |
| 2010/0249513 | A1* | 9/2010 | Tydlaska | A61B 1/00052 600/186 |
| 2011/0221219 | A1* | 9/2011 | Heaton | A63B 47/02 294/210 |

* cited by examiner

*Primary Examiner* — Mohammed S Rahaman
(74) *Attorney, Agent, or Firm* — Akerman LLP; Mammen (Roy) P. Zachariah, Jr.

(57) ABSTRACT

A retrieving device for retrieving an object may be provided. The retrieving device may include a retriever pole that may include a scooping device positioned at one end of the retriever pole. The scooping device may be configured to retrieve the object when positioned over the object. Additionally, the retrieving device may include a camera configured to record image data of an area within a viewing range of the camera and image data associated with the object. The retrieving device may also include a monitor positionable at the other end of the retrieving pole, which may be electrically coupled to the camera via an insulated electrical wire. The monitor may display the image data of the area and the image data associated with the object recorded by the camera. Furthermore, the retrieving device may include a power source that may be electrically coupled to the monitor and the camera.

11 Claims, 37 Drawing Sheets

RETRIEVING DEVICE

RELATED APPLICATIONS AND PRIORITY

This application is a continuation of and claims the benefit of U.S. patent application Ser. No. 13/430,165 filed Mar. 26, 2012, which claims priority to U.S. Provisional Application No. 61/467,484, filed Mar. 25, 2011, both of which are hereby incorporated by reference in their entireties.

FIELD OF THE INVENTION

The present application relates to devices, methods, and apparatuses for retrieving objects, and more particularly to a retrieving device.

BACKGROUND

Often times, it is easy for individuals to misplace or even lose personal belongings, particularly when the individuals are traveling through large spaces, when the individuals are in places they are unfamiliar with, or when such belongings have relatively small dimensions. For example, many golf courses in the world have very large and vast spaces that include hazardous areas where a golfer can easily misplace or lose a golf ball or other item. When a golfer loses golf balls or other items, they can be expensive to replace and can cause frustration and game delays as well. Typical hazardous areas often include water hazards such as ponds, lakes, and rivers, manmade hazards such as bunkers, and natural hazards such as dense vegetation, trees, and the like. As a result, companies have developed products ranging from driving-range golf ball pickers to handheld golf ball retrievers to assist golfers in retrieving golf balls or other objects.

Although driving-range golf ball pickers can retrieve many golf balls at a time, they are often large, unwieldy, and cannot traverse hazardous areas with ease. Additionally, driving-range golf ball pickers can be quite expensive, require a significant amount of storage space, and are not portable. Handheld golf ball retrievers, on the other hand, tend to be readily portable and often include the use of a retriever pole that has a scooping device or net attached at an end of the retriever pole that is utilized to retrieve golf balls. However, many handheld golf ball retrievers tend to be flimsy or ineffective in assisting the golfers in retrieving their misplaced golf balls.

SUMMARY

In accordance with one aspect of the exemplary embodiments provided herein, a retrieving device for retrieving an object may be provided. The retrieving device may be utilized in locating and retrieving various objects such as golf balls or any other object. On average, golfers enjoy spending most of their time actively playing golf and often spend over three dollars per golf ball, and, as a result, finding misplaced or lost golf balls efficiently and effectively is important to golfers. Accordingly, an individual may utilize a camera and a monitor of the retrieving device to locate and view a misplaced or lost golf ball in an efficient and effective manner. The retrieving device may be portable and may be used by the individual in a variety of locations such as, but not limited to, hazardous areas including ponds, lakes, rivers, bunkers, rough areas, dense vegetation, and other such areas. Once the golf ball is located, the individual can retrieve the golf ball using a scooping device of the retrieving device.

In an embodiment, the retrieving device may include a retriever pole that may include a scooping device positionable at a distal end of the retriever pole. The scooping device may be configured to retrieve the object when the scooping device is positioned over the object. Additionally, the retrieving device may include a camera that may be configured to record image data of an area within a viewing range of the camera and image data associated with the object. The retrieving device may also include a monitor that is positionable near a proximal end of the retriever pole. The monitor may be electrically coupled to the camera via an insulated electrical wire that may be wrapped around a portion of the retriever pole that lies between the monitor and the camera. Also, the monitor may be configured to display the image data of the area and the image data associated with the object recorded by the camera. Furthermore, the retrieving device may include a power source that may be electrically coupled to the monitor and the camera. The power source may be configured to provide electrical power to the monitor and the camera.

In accordance with another exemplary embodiment, a method for retrieving an object using a retrieving device, which can include, but is not limited to including, the steps of: searching an area for the object by utilizing the retrieving device, wherein the retrieving device includes a scooping device configured to retrieve the object when the scooping device is positioned over the object; recording image data of the area and image data associated with the object by utilizing a camera of the retrieving device; transmitting a signal including the image data of the area and the image data associated with the object from the camera to a monitor of the retrieving device; displaying the image data of the area and the image data associated with the object via the monitor based on the signal; determining a location of the object based on the image data of the area and the image data associated with the object that is displayed via the monitor; and retrieving the object using the scooping device after determining the location of the object.

In accordance with another exemplary embodiment, a kit for a retrieving device may be provided. The kit for the retrieving device may include an extendable retriever pole that may be configured to increase a length of the retrieving device when extended and decrease a length of the retrieving device when retracted. Additionally, the kit may include a camera that may be attachable to the extendable retriever pole and configured to record image data associated with an area and an object. The kit for the retrieving device may further include a monitor that may be attachable to the extendable retriever pole and configured to display the image data associated with the area and the object. Also, the kit may include a power source that may be configured to provide power to the camera and the monitor. Furthermore, the kit may include an electrical wire that may be connectable to the camera, the monitor, and the power source.

The above-described and other features and advantages of the present disclosure will be appreciated and understood by those skilled in the art from the following detailed description, drawings, and appended claims.

DETAILED DESCRIPTION OF THE INVENTION

Figure 1A:
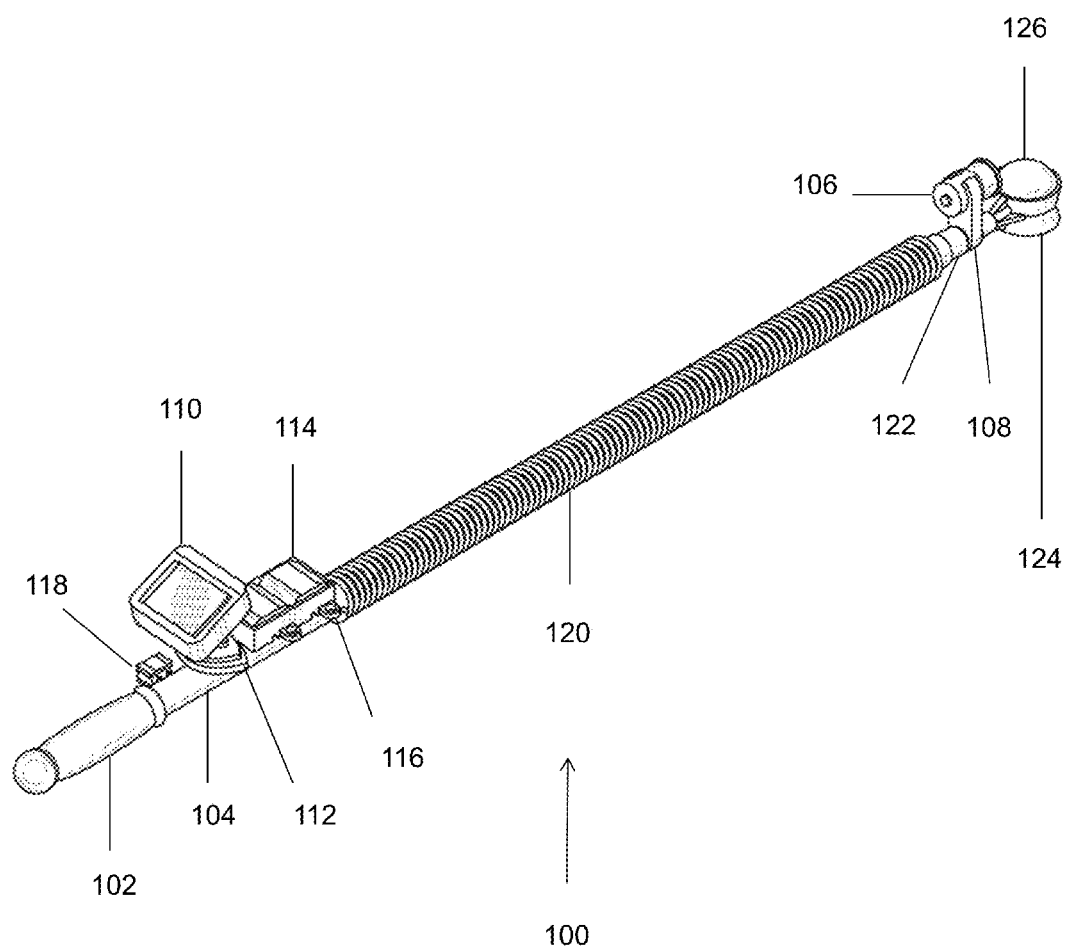
FIG. 1A illustrates an isometric view of a retrieving device including a detachable monitor, power source, on/off switch, camera, and scooping device according to one embodiment.
Figure 1B:
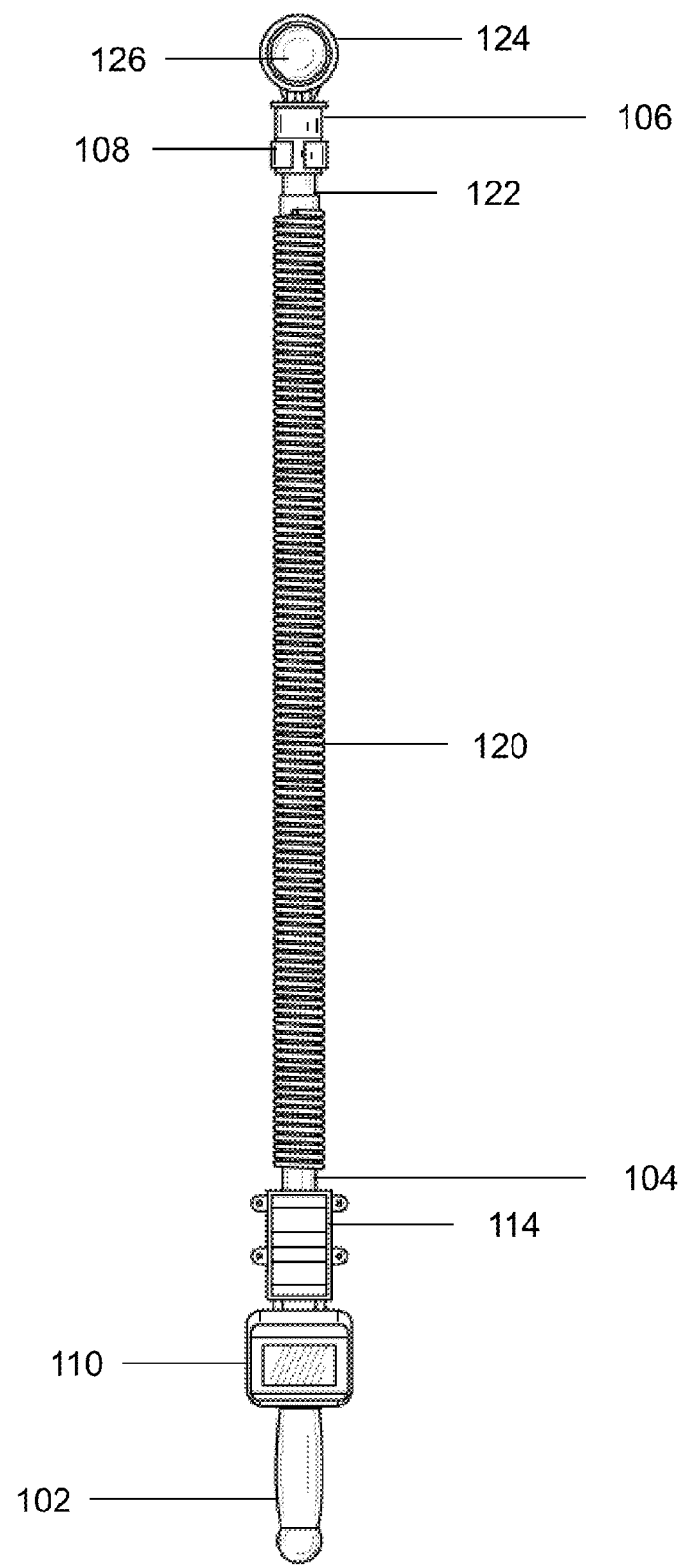
FIG. 1B illustrates a front view of the retrieving device of FIG. 1A.
Figure 1C:
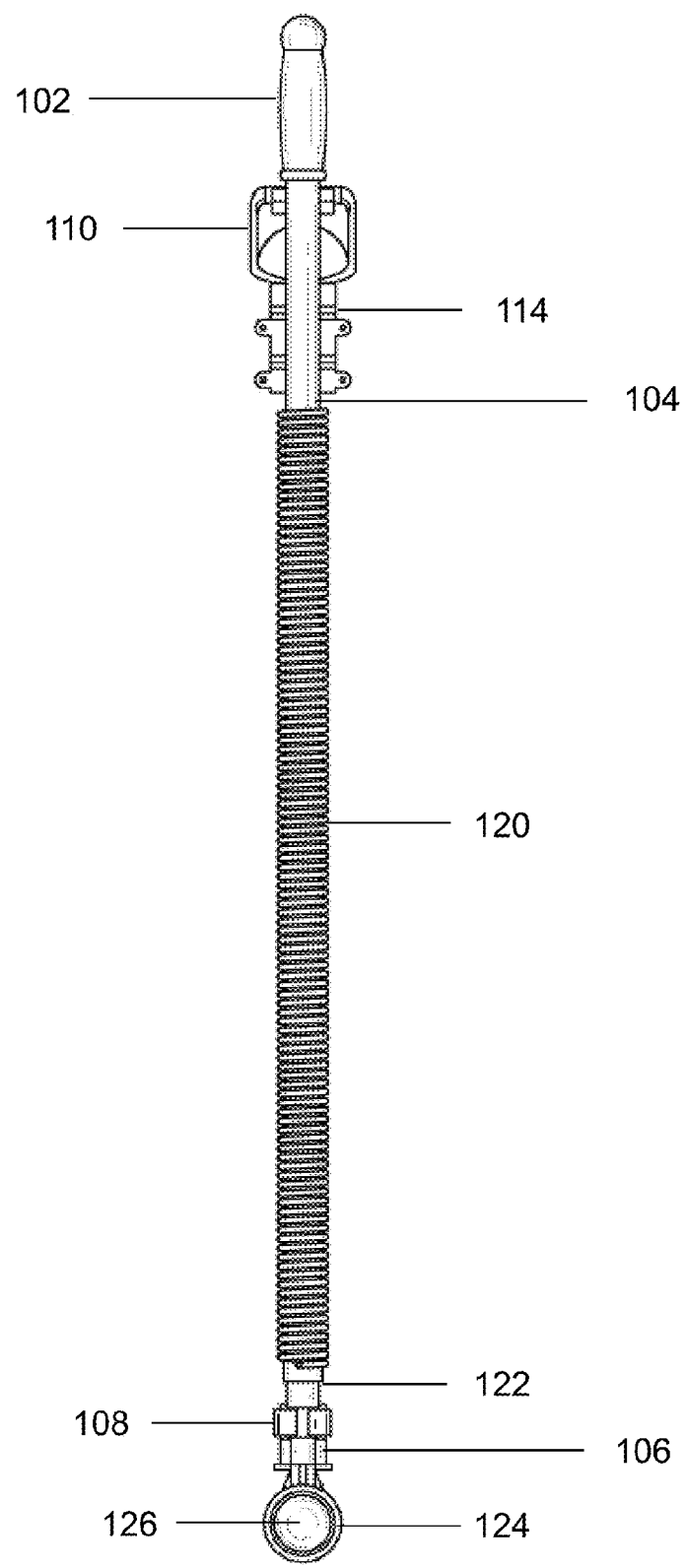
FIG. 1C illustrates a back view of the retrieving device of FIG. 1A.
Figure 1D:
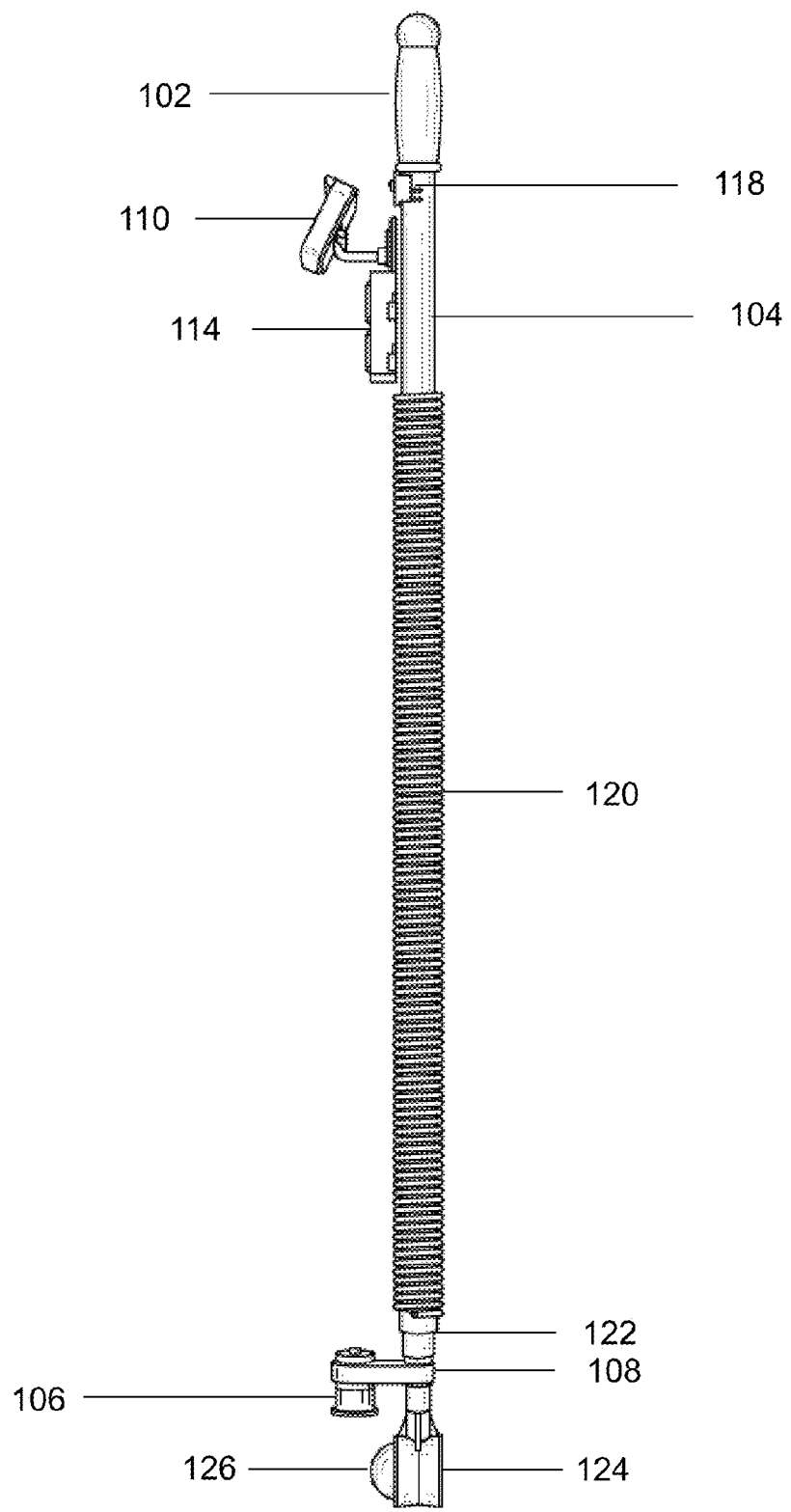
FIG. 1D illustrates a left side view of the retrieving device of FIG. 1A.
Figure 1E:
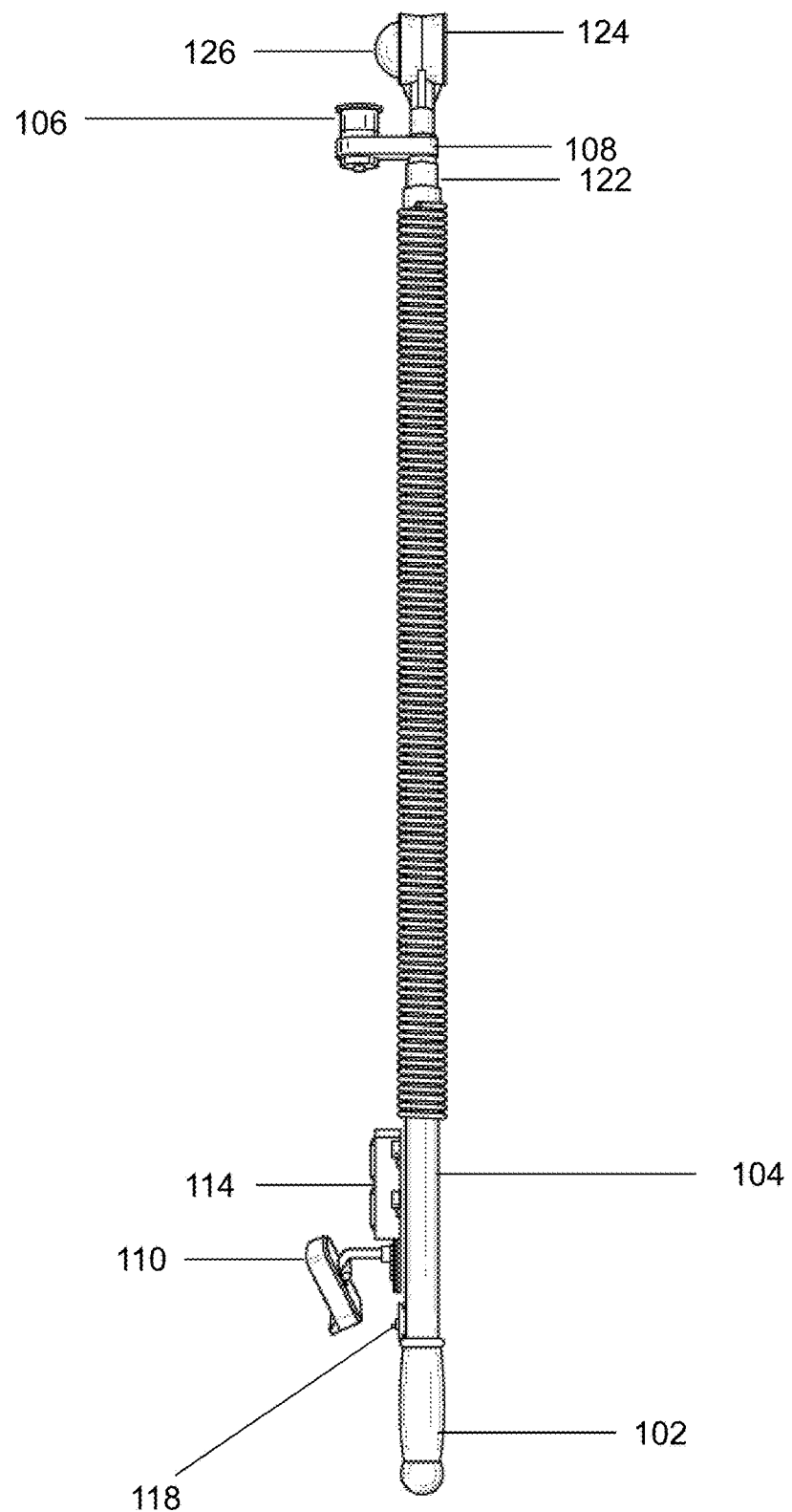
FIG. 1E illustrates a right side view of the retrieving device of FIG. 1A.
Figure 1F:
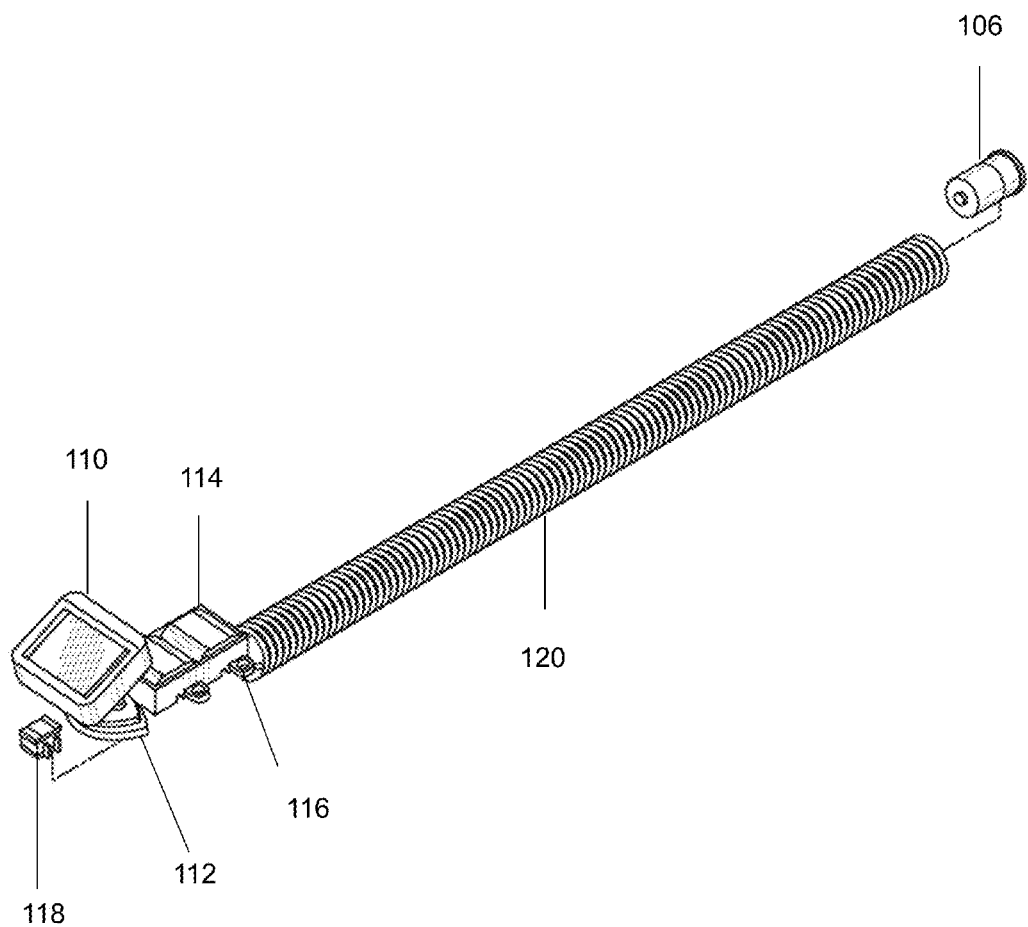
FIG. 1F illustrates a partially exploded view of the on/off switch, electrical wire, monitor, power source, and video camera of the retrieving device of FIG. 1A.
Figure 1G:
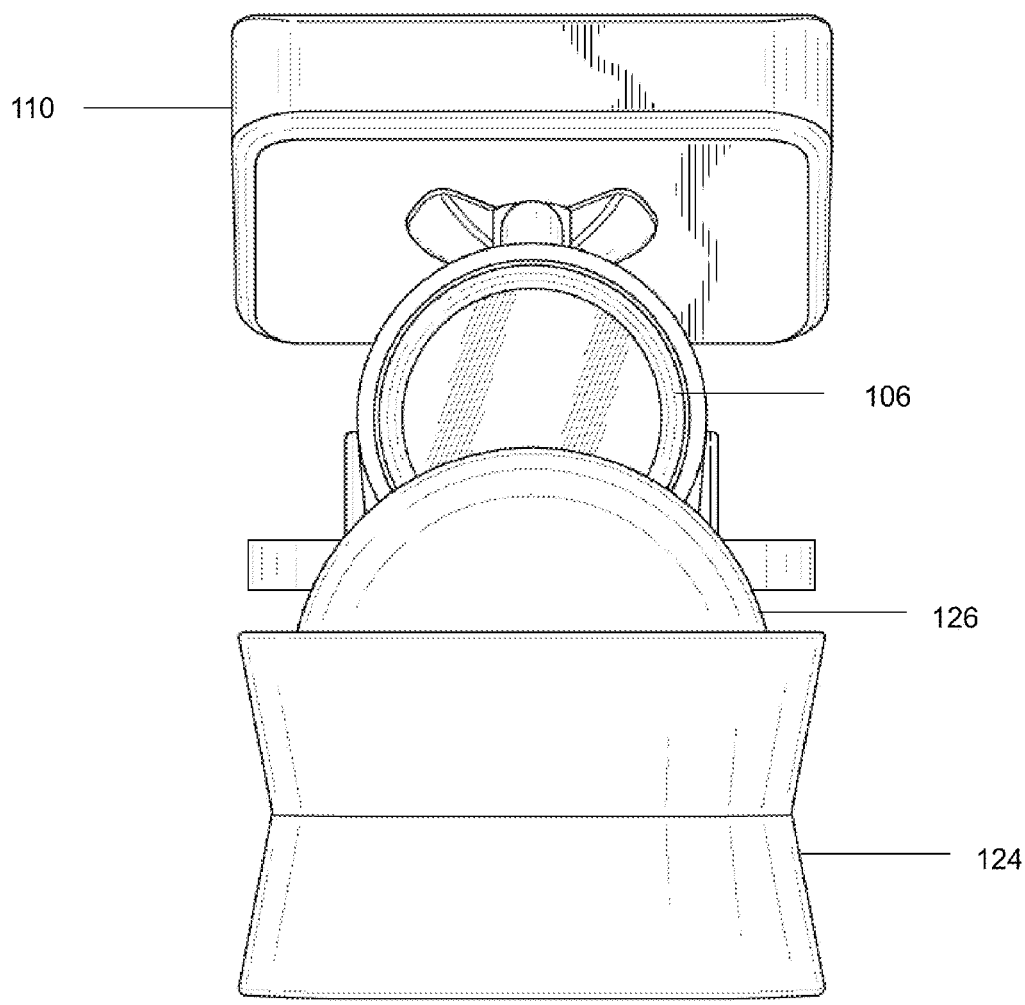
FIG. 1G illustrates a bottom view of the retrieving device of FIG. 1A.
Figure 1H:
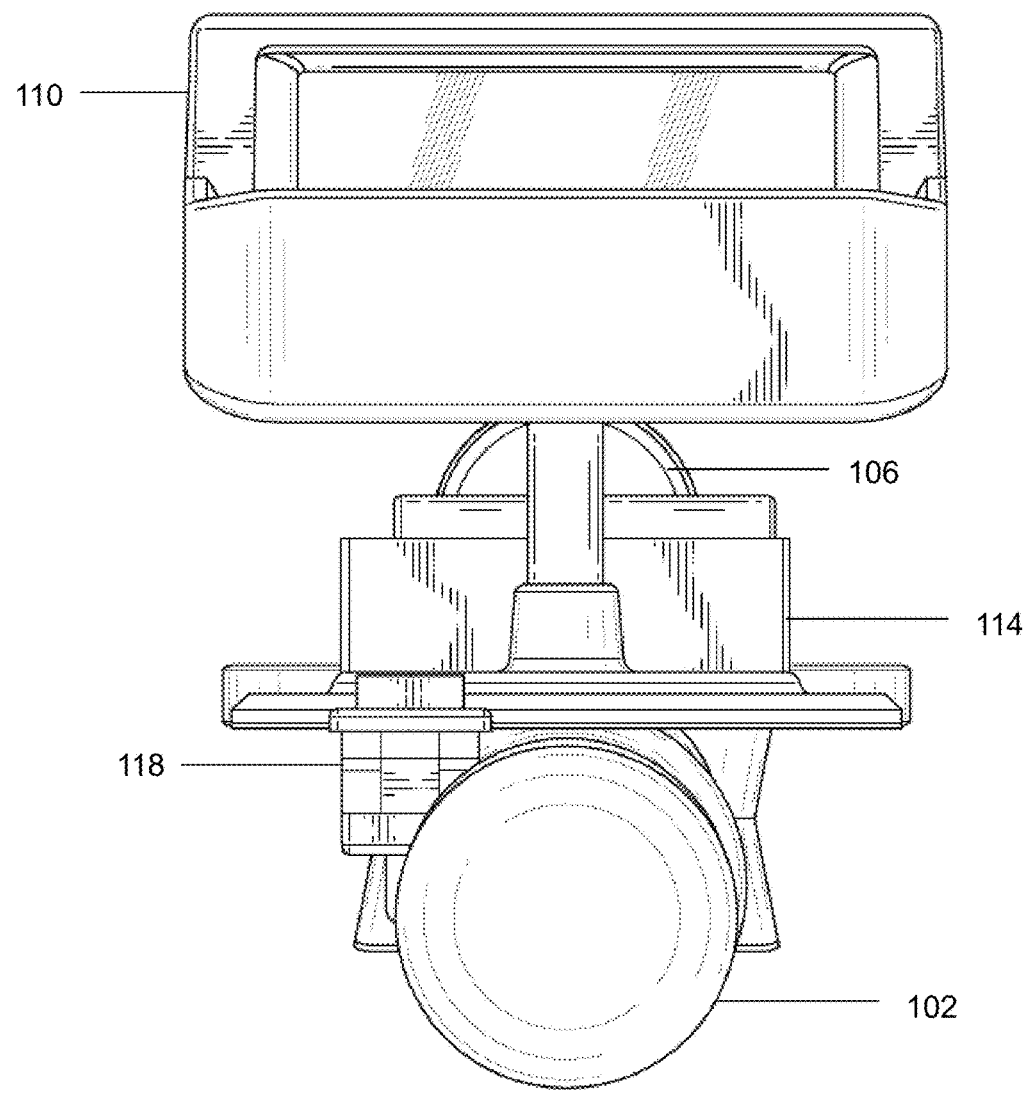
FIG. 1H illustrates a top view of the retrieving device of FIG. 1A.
Figure 2A:
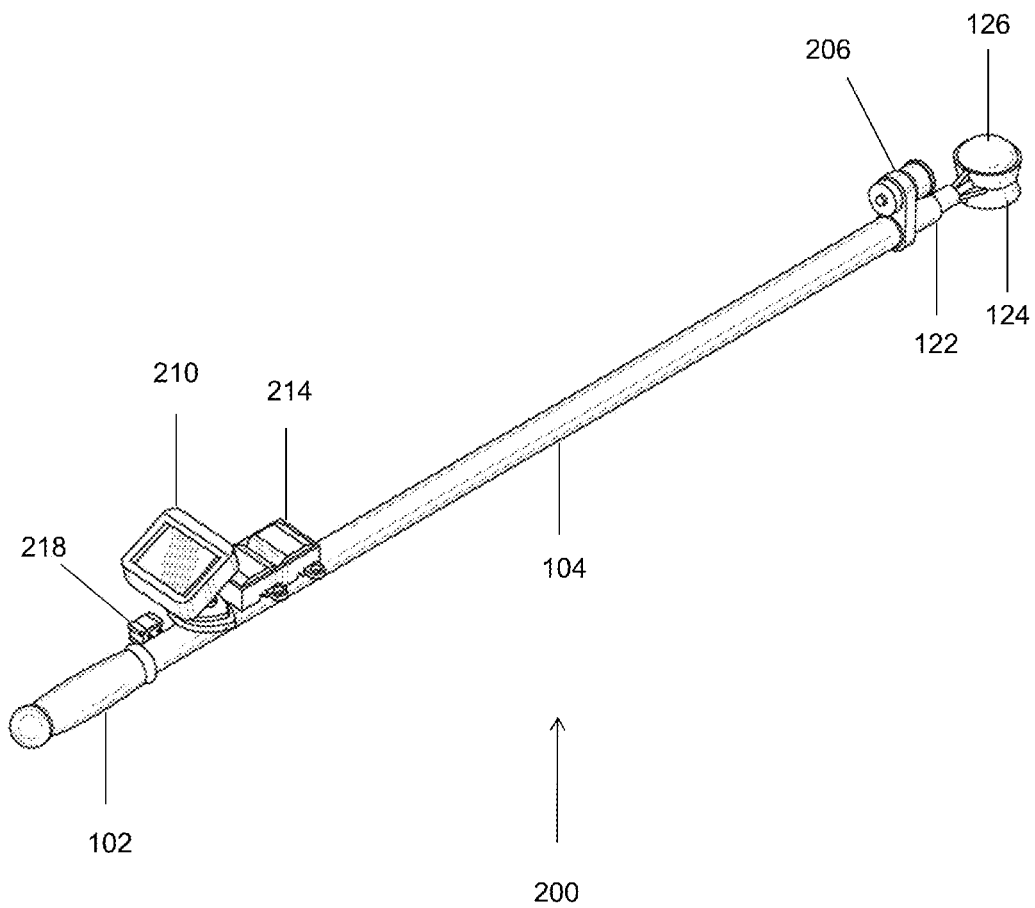
FIG. 2A illustrates an isometric view of a retrieving device including a fixed monitor, power source, and camera according to an embodiment.
Figure 2B:
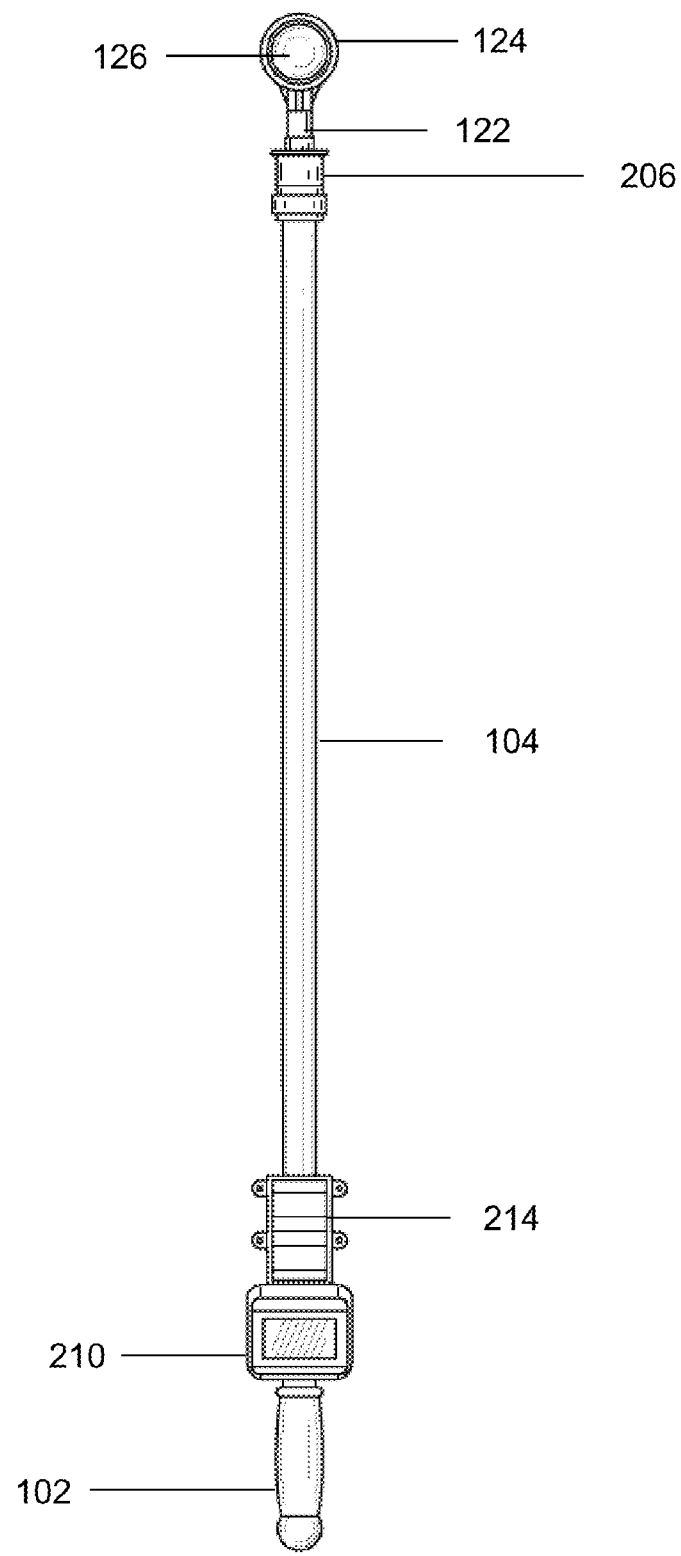
FIG. 2B illustrates a front view of the retrieving device of FIG. 2A.
Figure 2C:
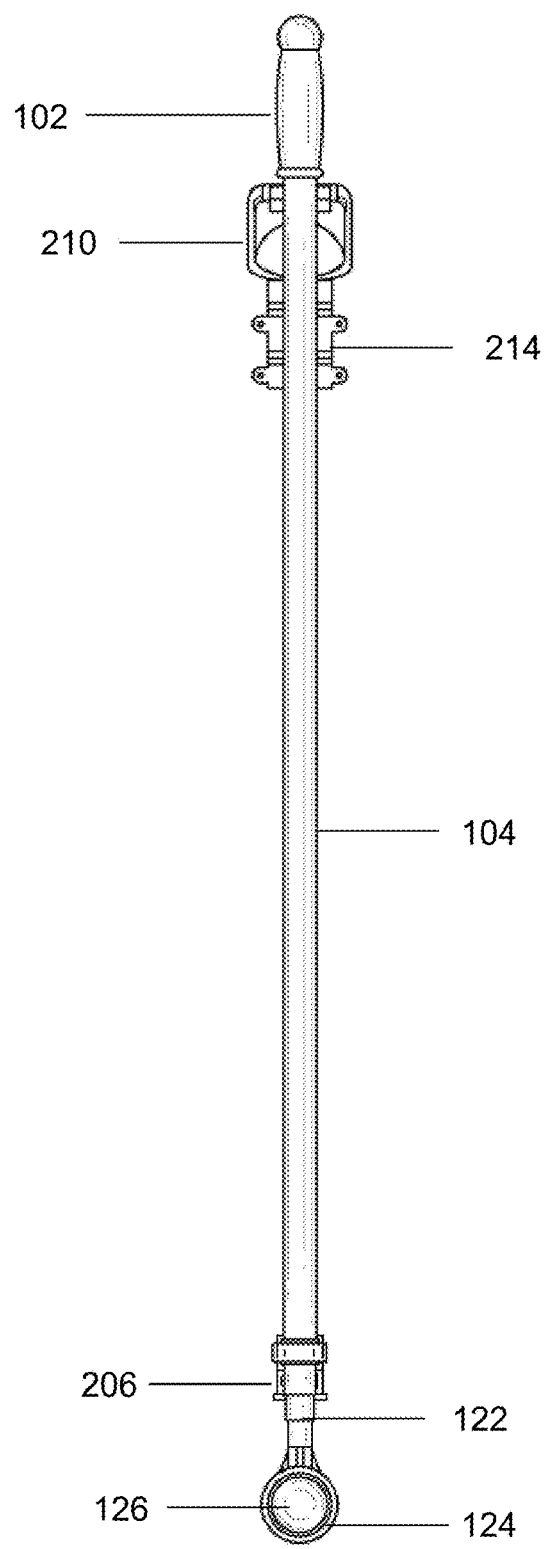
FIG. 2C illustrates a back view of the retrieving device of FIG. 2A.
Figure 2D:
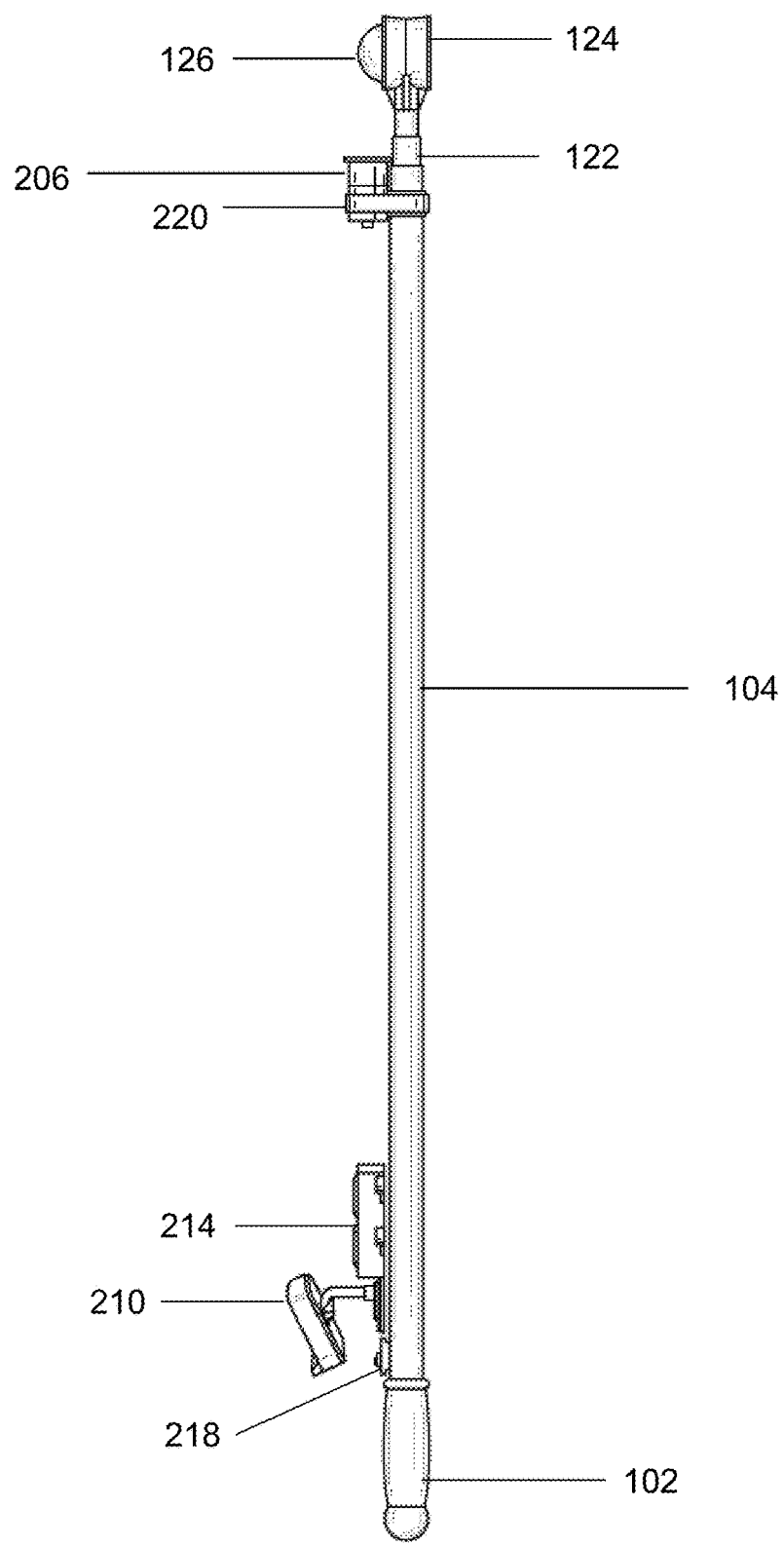
FIG. 2D illustrates a right side view of the retrieving device of FIG. 2A.
Figure 2E:
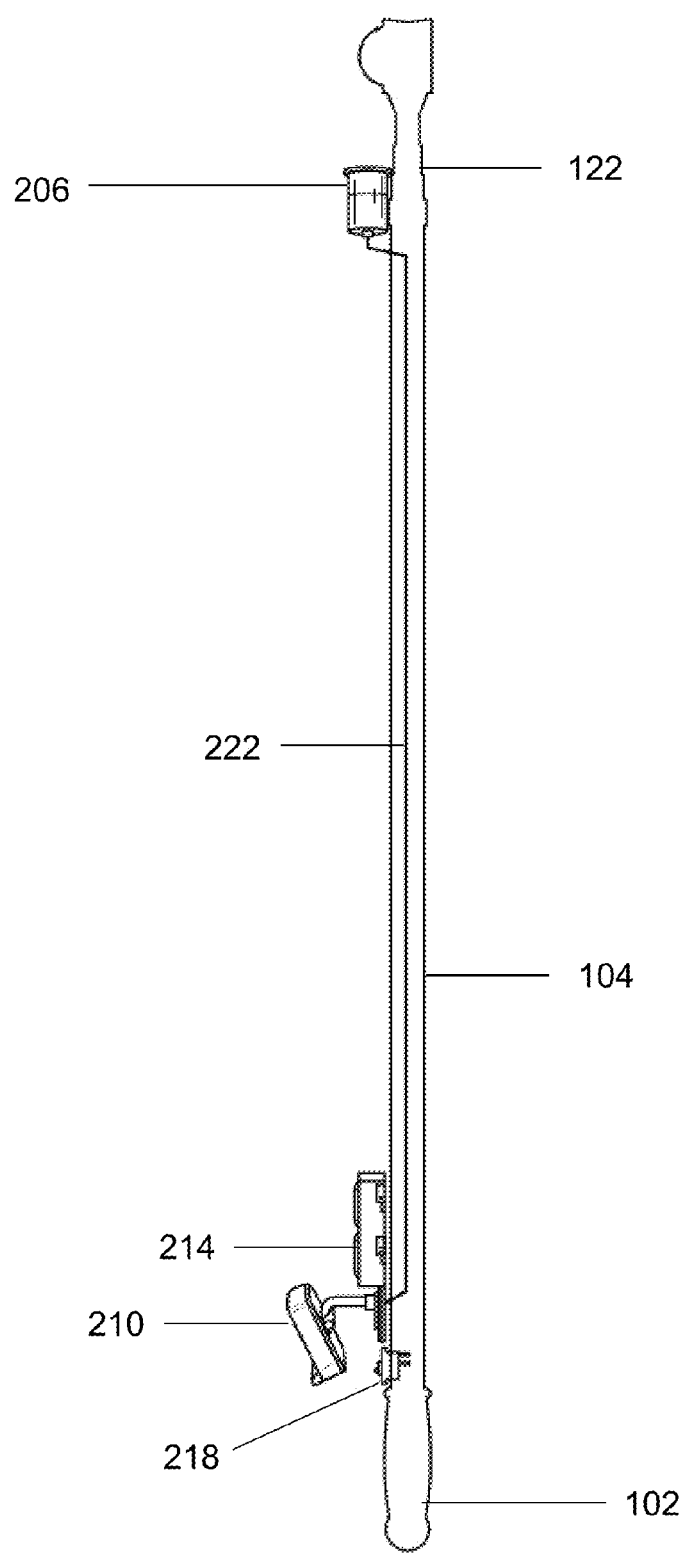
FIG. 2E illustrates a left side view of the retrieving device of FIG. 2A.
Figure 2F:
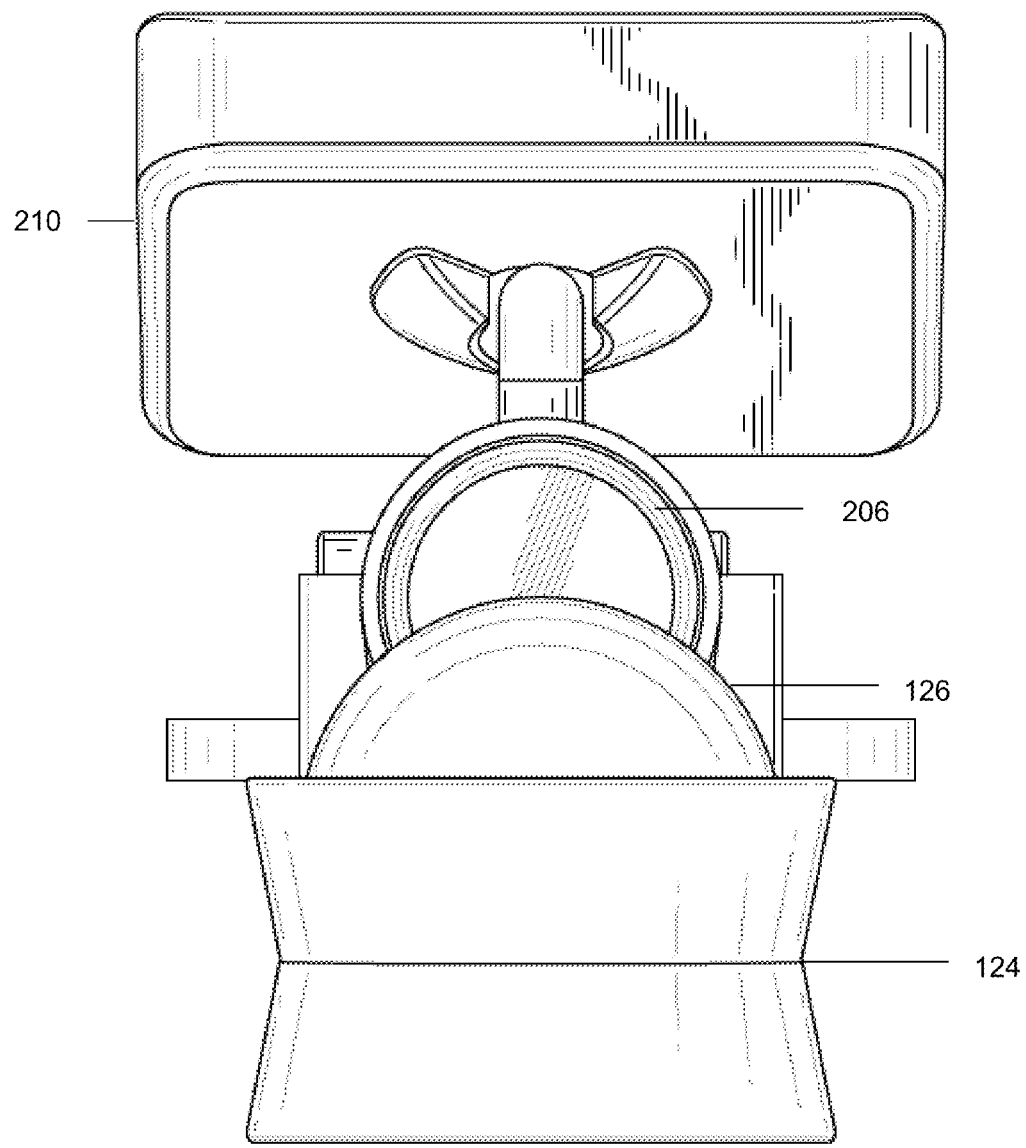
FIG. 2F illustrates a bottom view of the retrieving device of FIG. 2A.
Figure 2G:
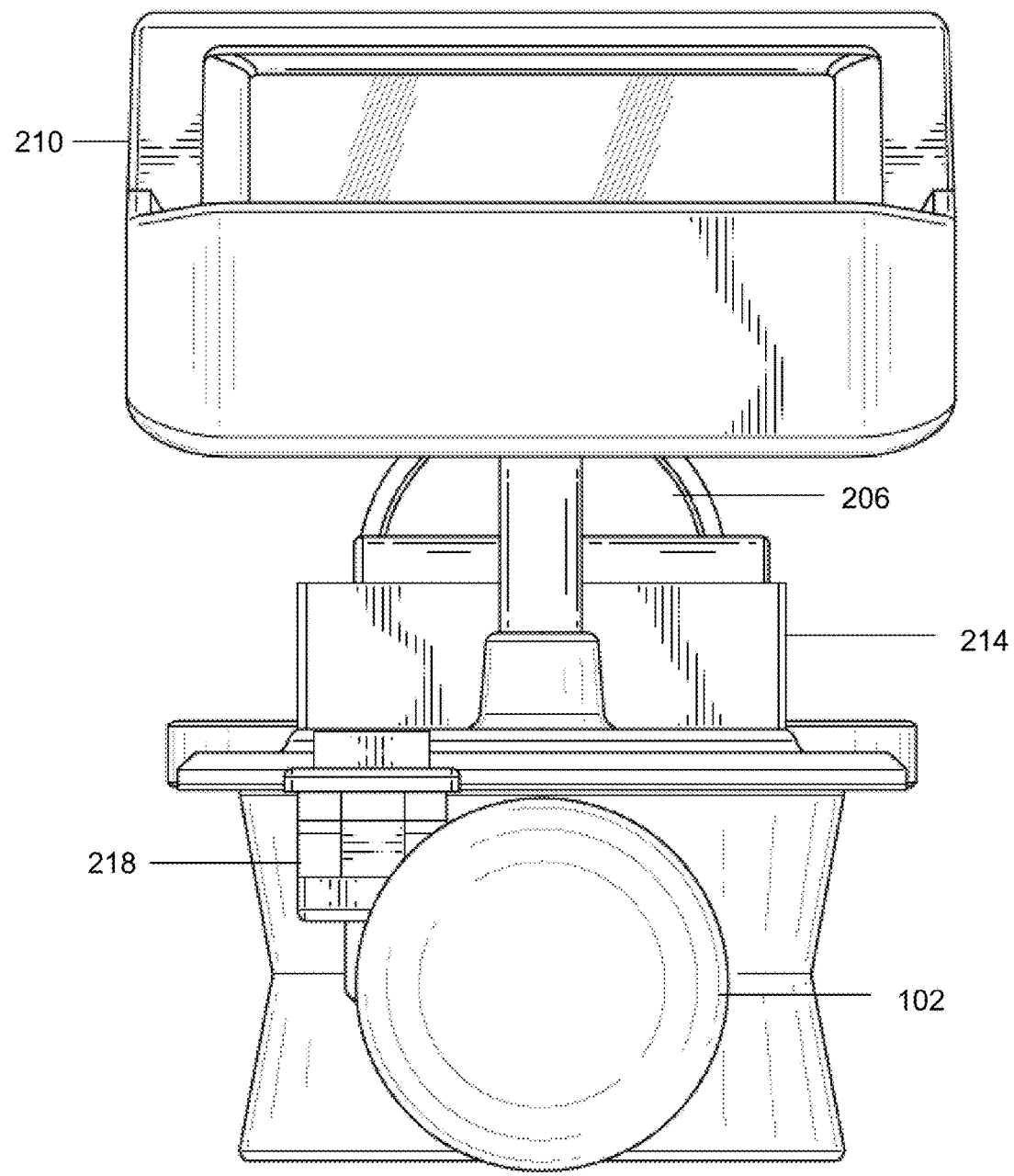
FIG. 2G illustrates a top view of the retrieving device of FIG. 2A.
Figure 3A:
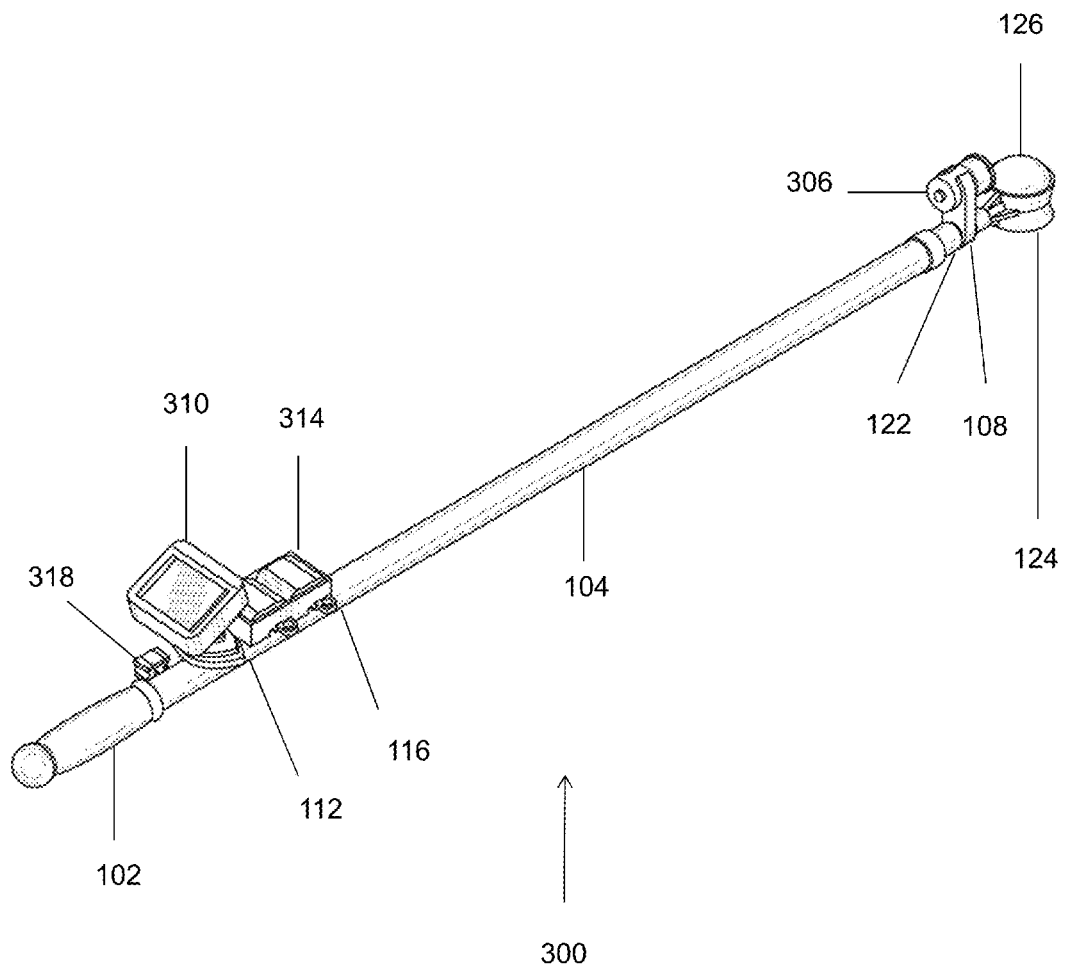
FIG. 3A illustrates an isometric view of a retrieving device including a wireless monitor and camera according to an embodiment.
Figure 3B:
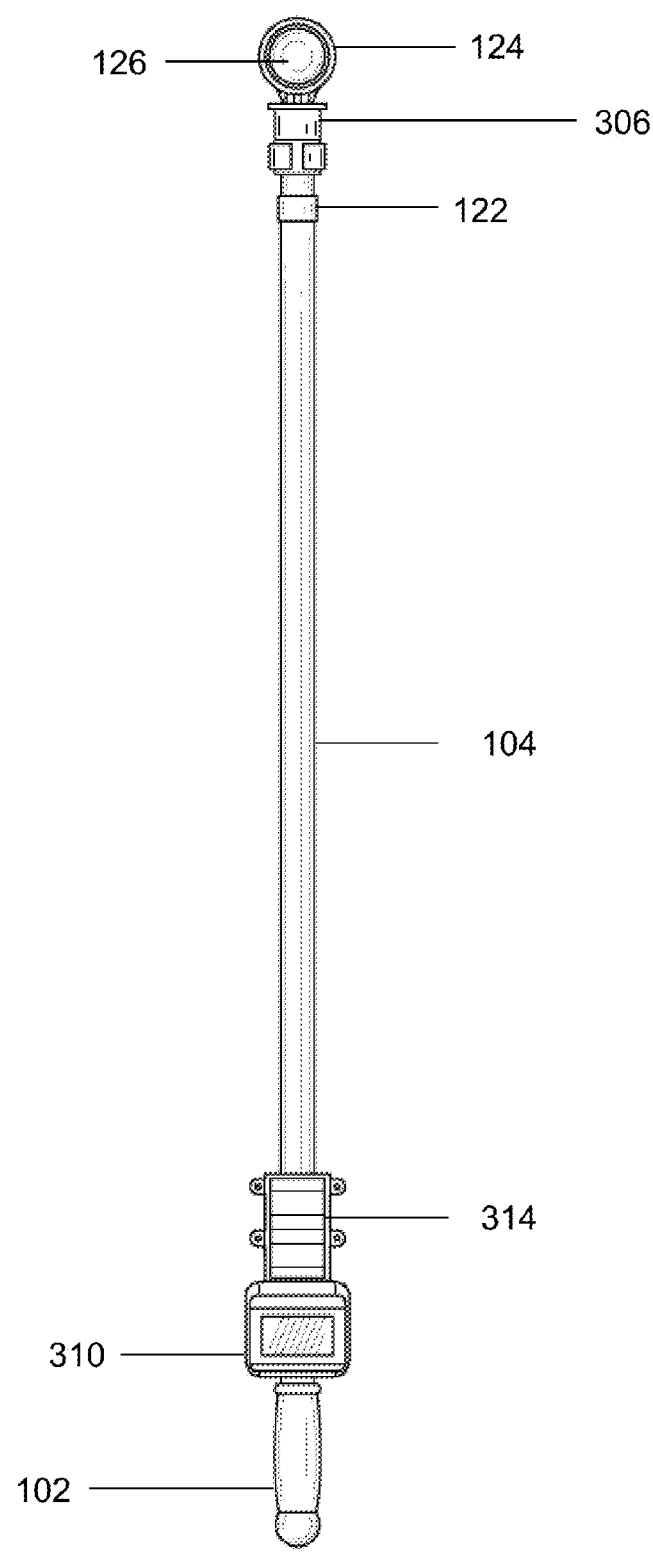
FIG. 3B illustrates a front view of the retrieving device of FIG. 3A.
Figure 3C:
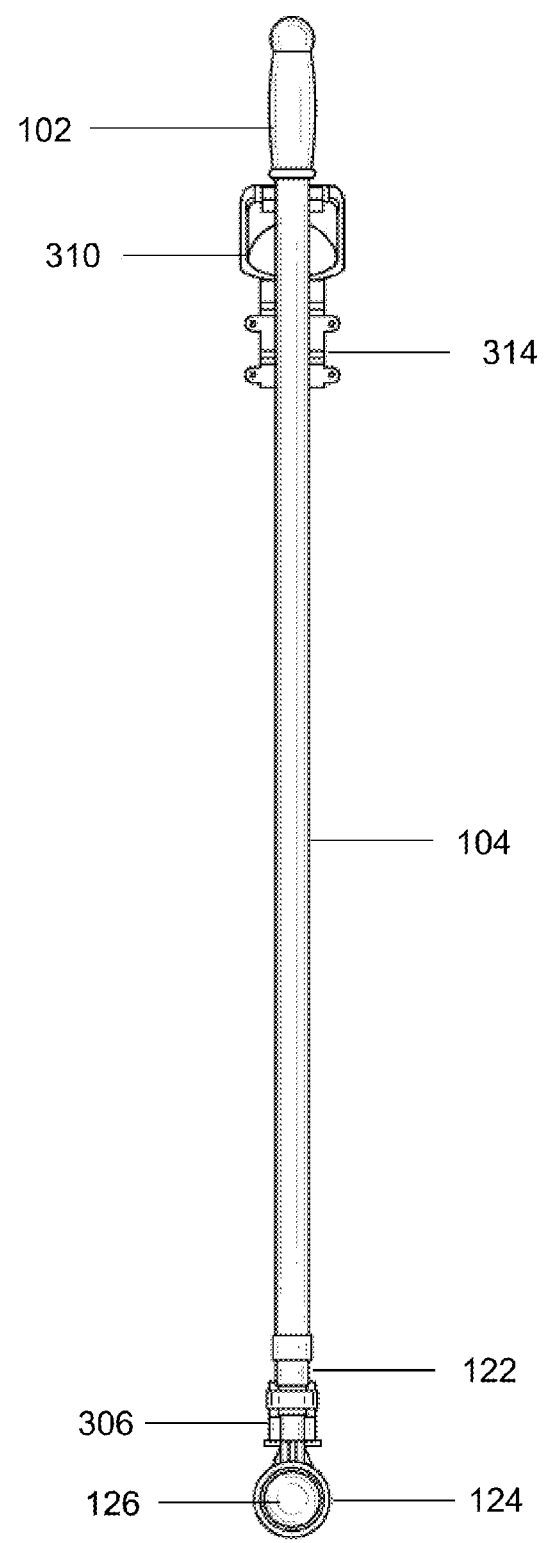
FIG. 3C illustrates a back view of the retrieving device of FIG. 3A.
Figure 3D:
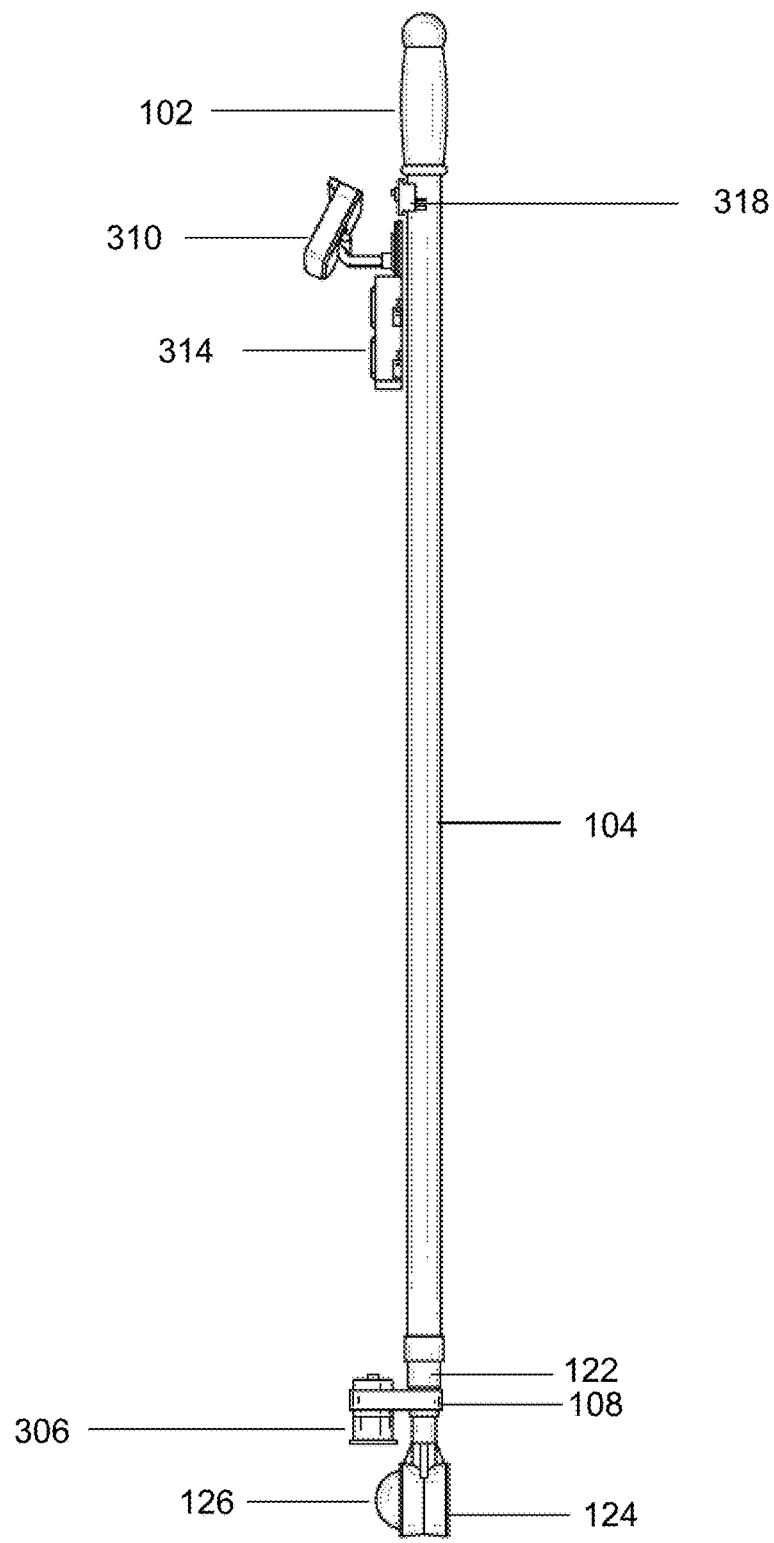
FIG. 3D illustrates a left side view of the retrieving device of FIG. 3A.
Figure 3E:
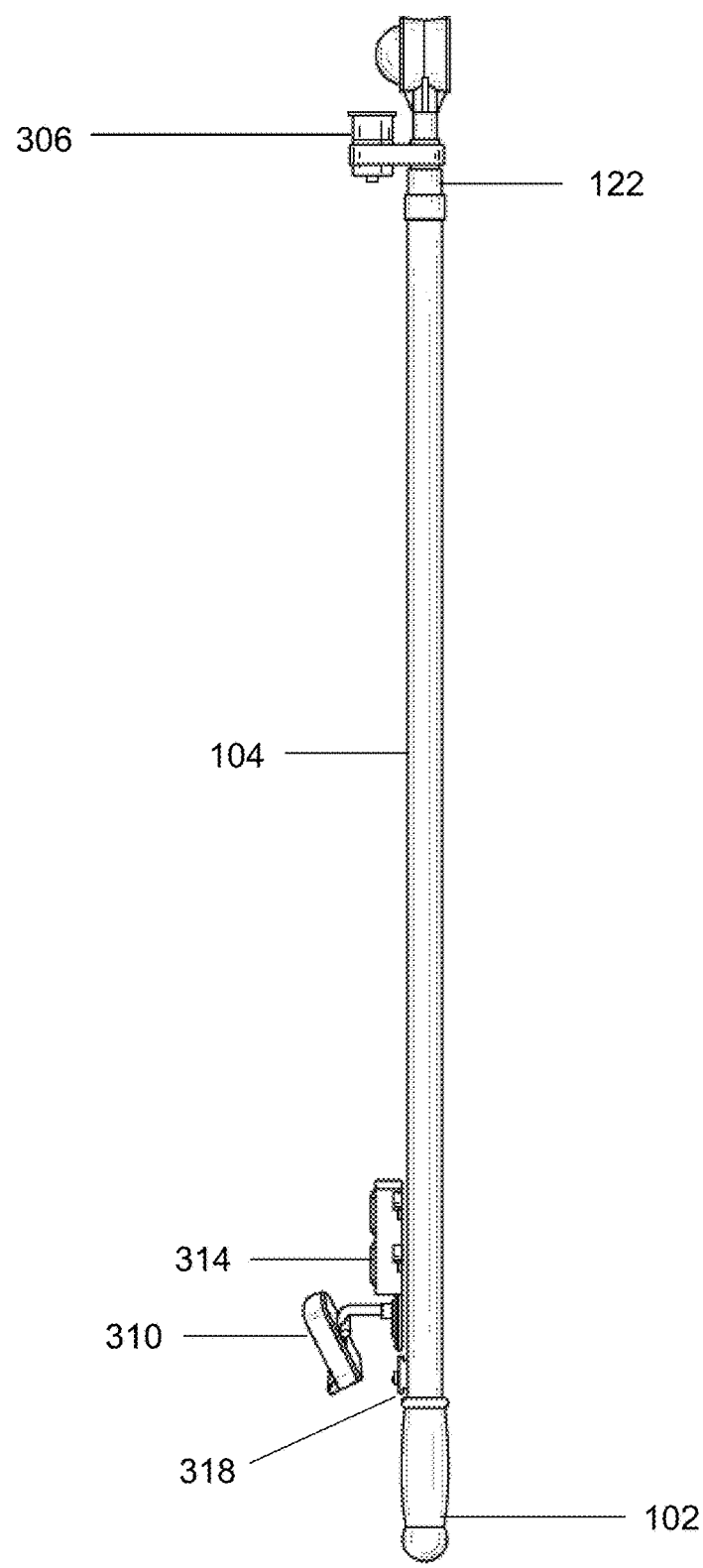
FIG. 3E illustrates a right side view of the retrieving device of FIG. 3A.
Figure 3F:
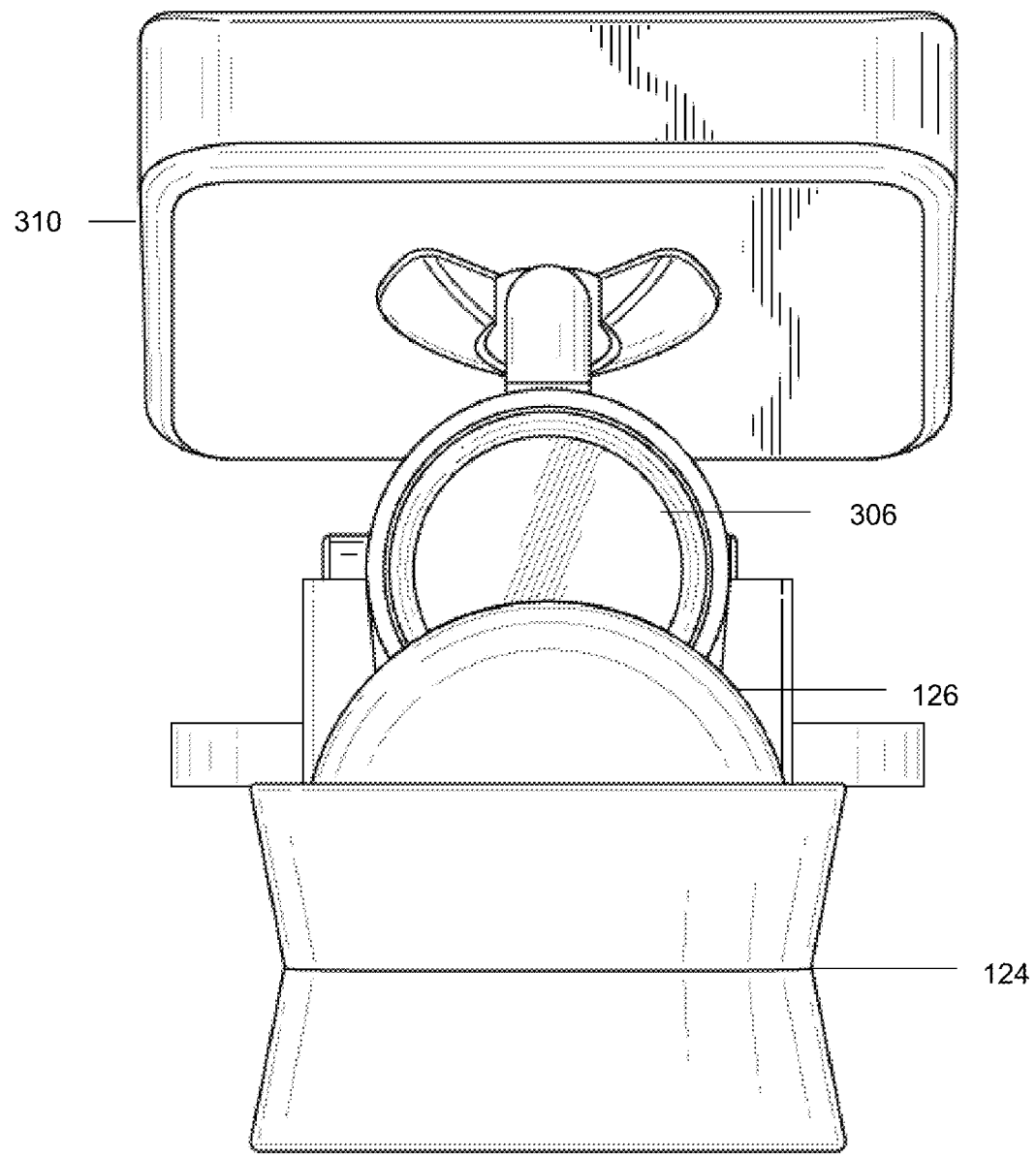
FIG. 3F illustrates a bottom view of the retrieving device of FIG. 3A.
Figure 3G:
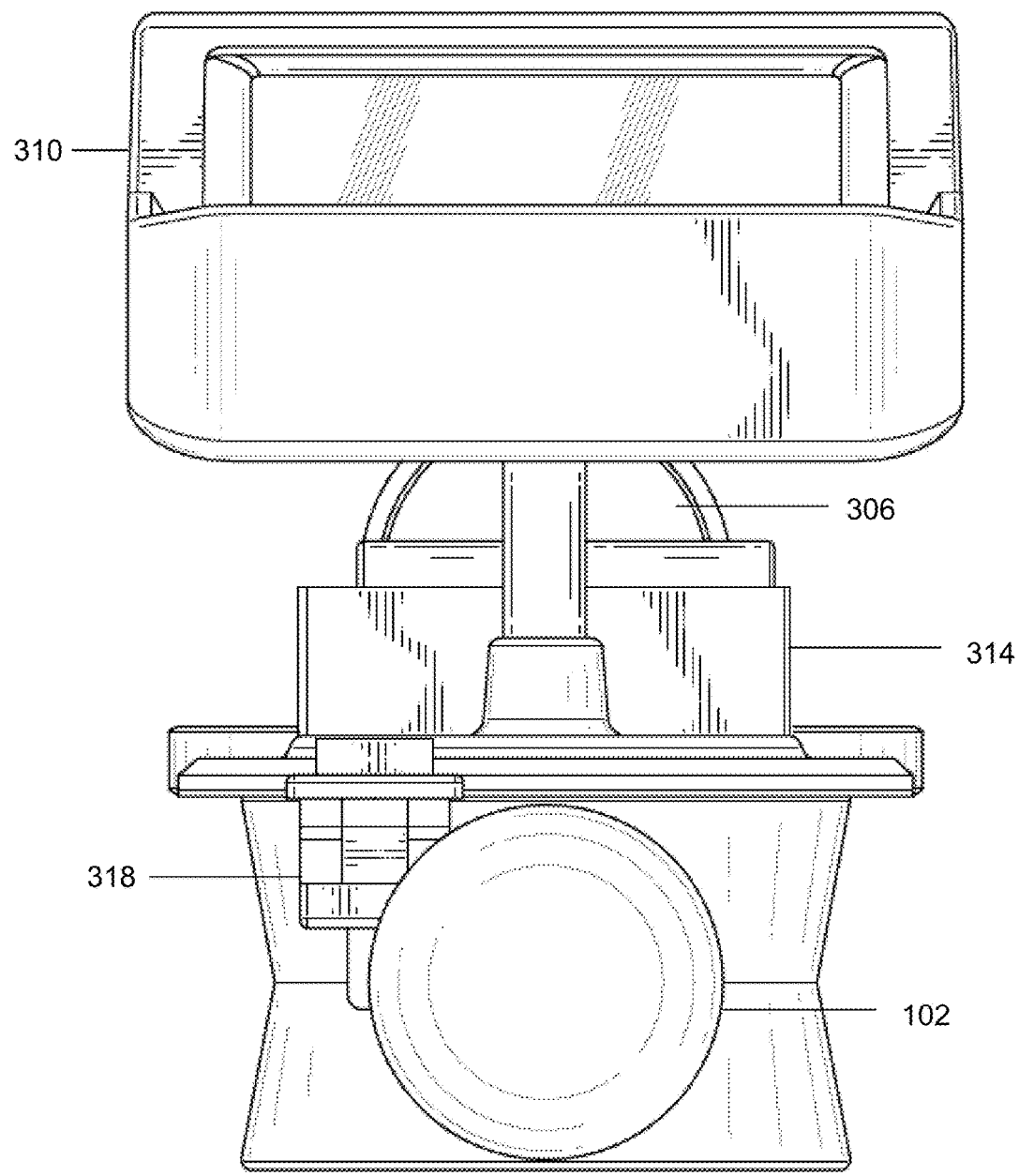
FIG. 3G illustrates a top view of the retrieving device of FIG. 3A.
Figure 4A:
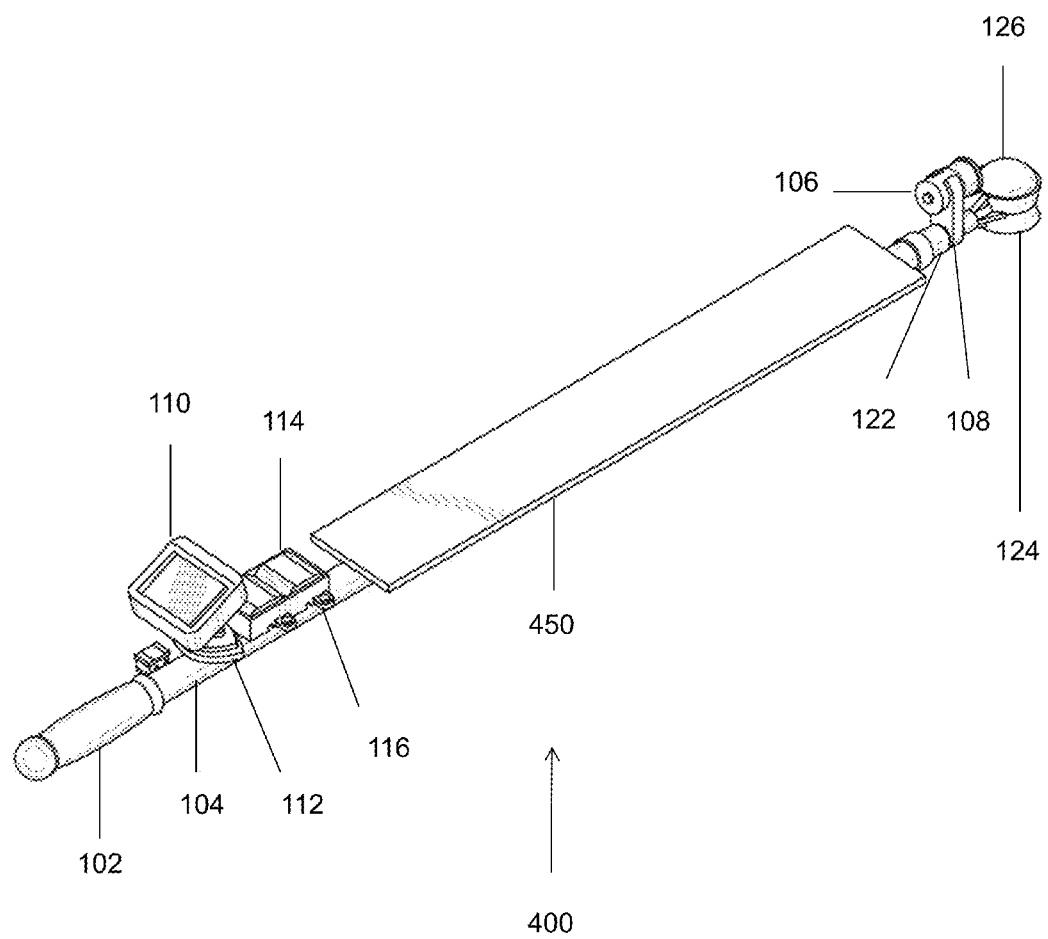
FIG. 4A illustrates an isometric view of a retrieving device including a rack for securing electrical wire according to an embodiment.
Figure 4B:
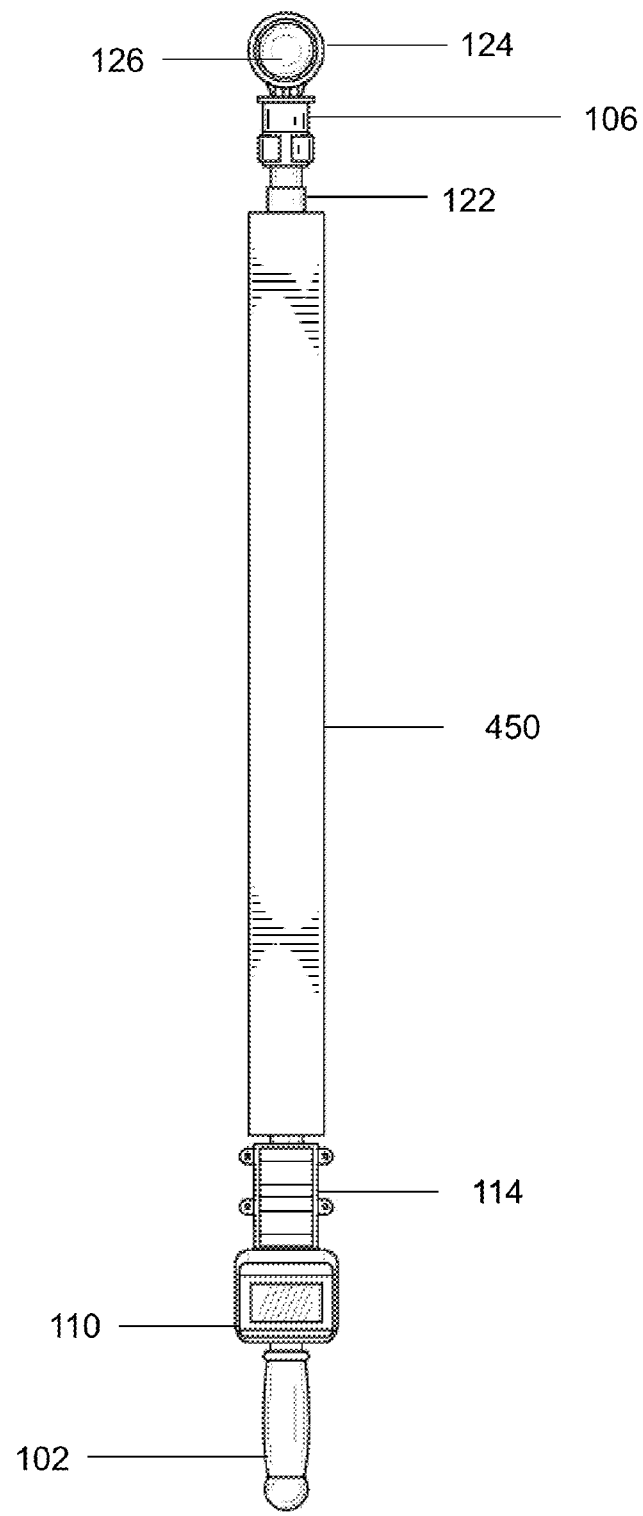
FIG. 4B illustrates a front view of the retrieving device of FIG. 4A.
Figure 4C:
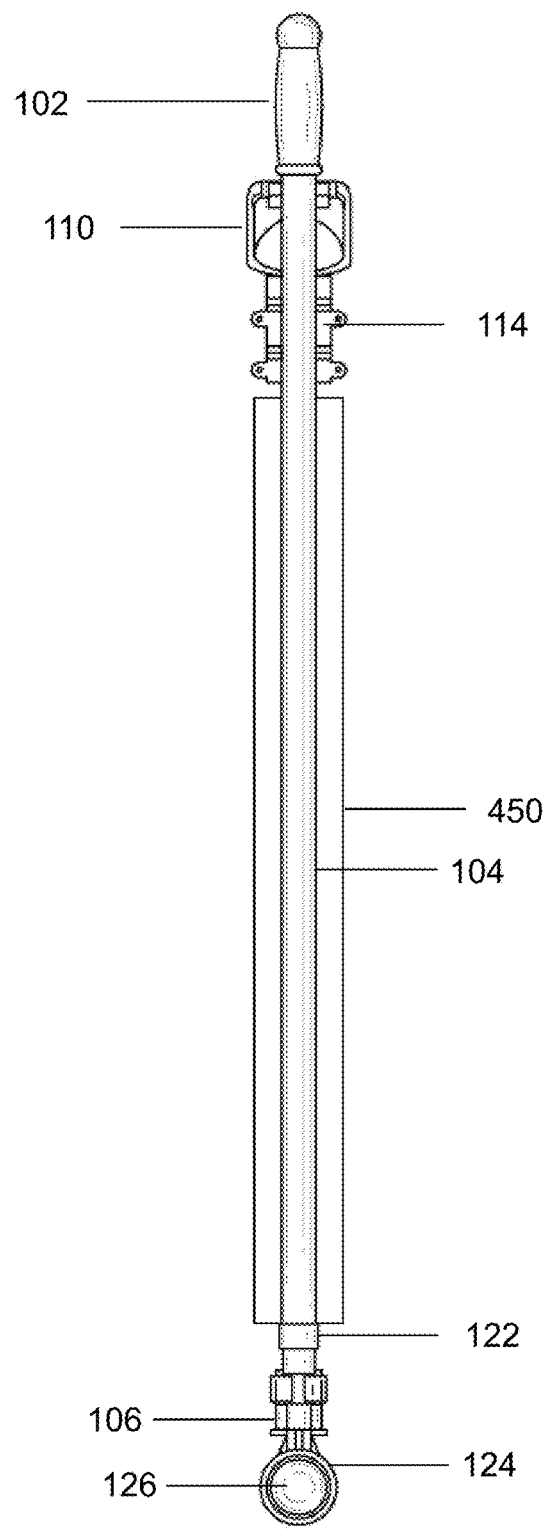
FIG. 4C illustrates a back view of the retrieving device of FIG. 4A.
Figure 4D:
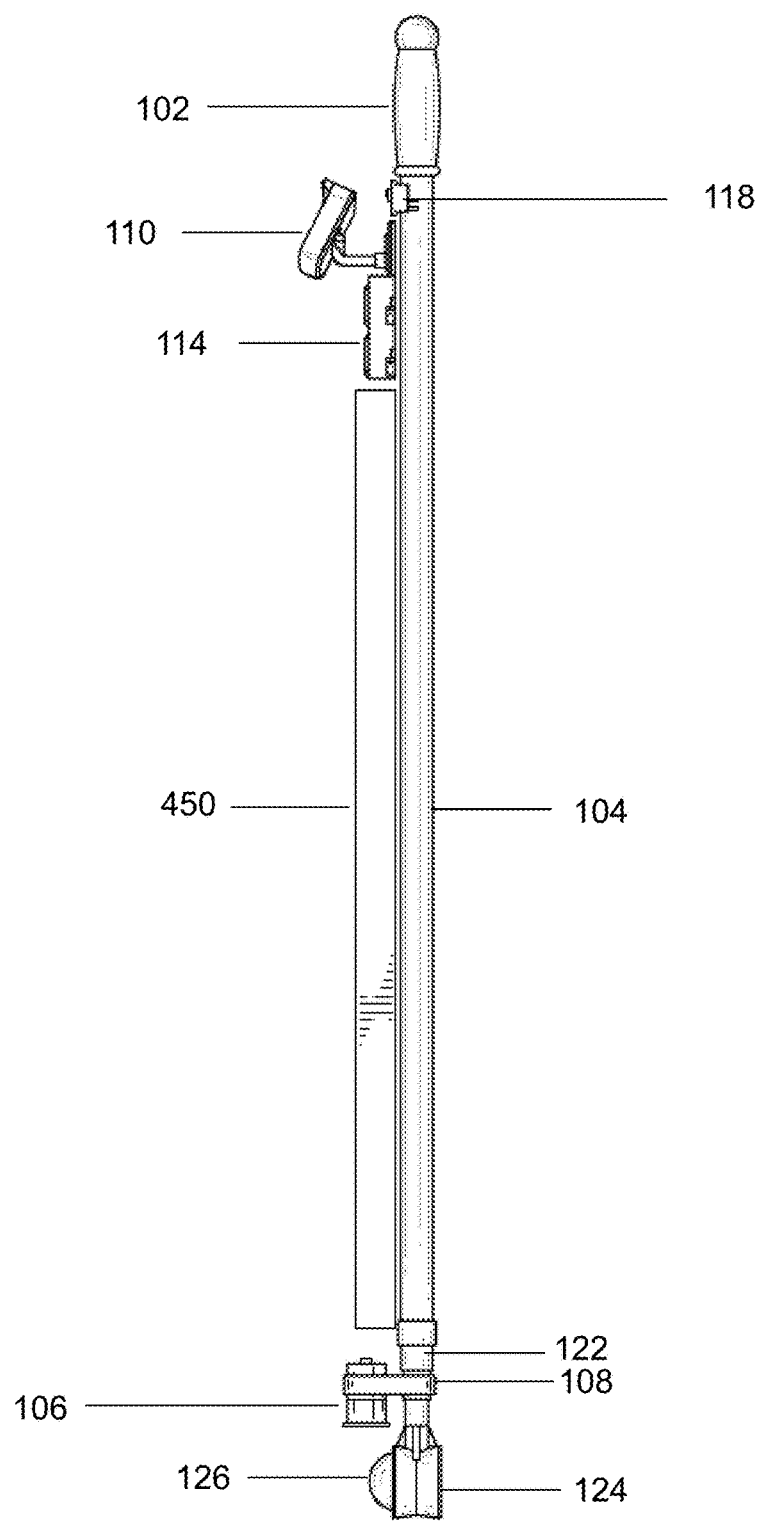
FIG. 4D illustrates a left side view of the retrieving device of FIG. 4A.
Figure 4E:
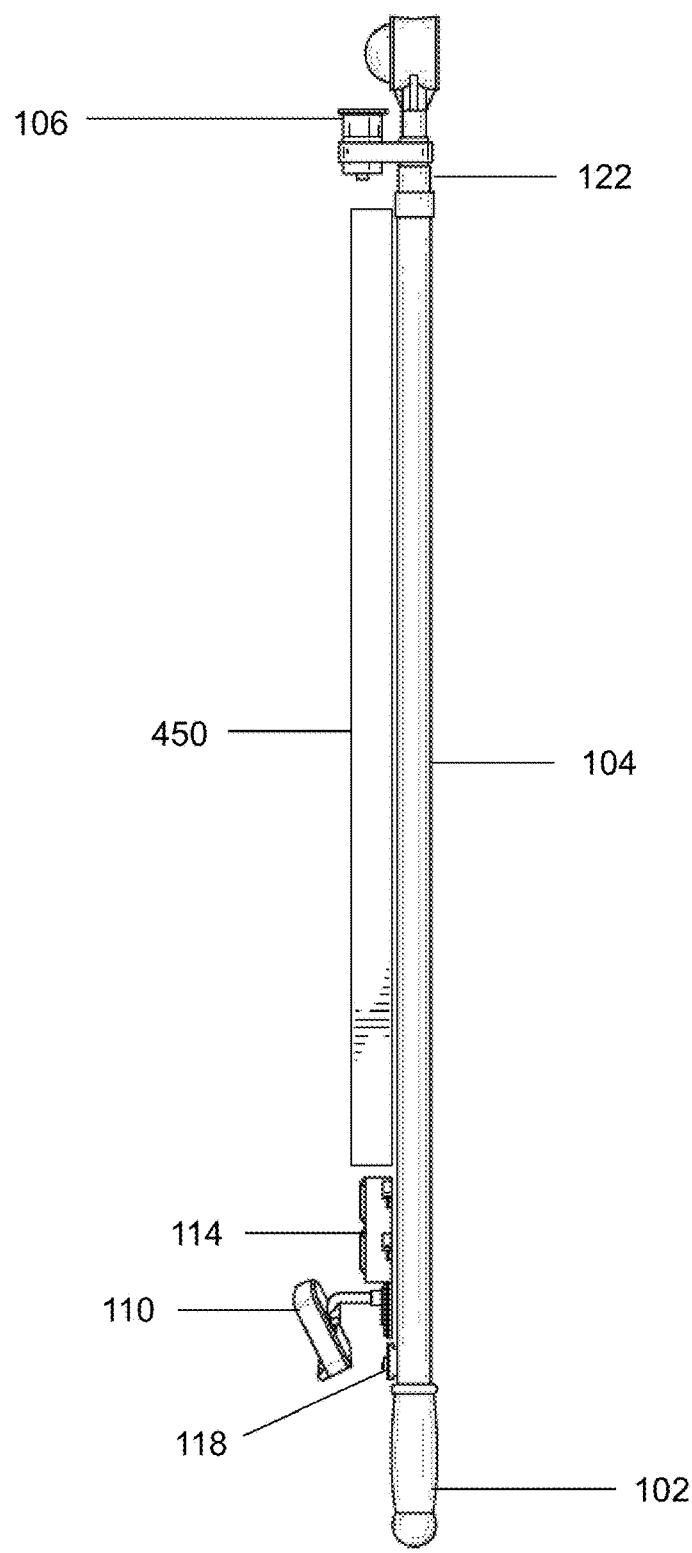
FIG. 4E illustrates a right side view of the retrieving device of FIG. 4A.
Figure 4F:
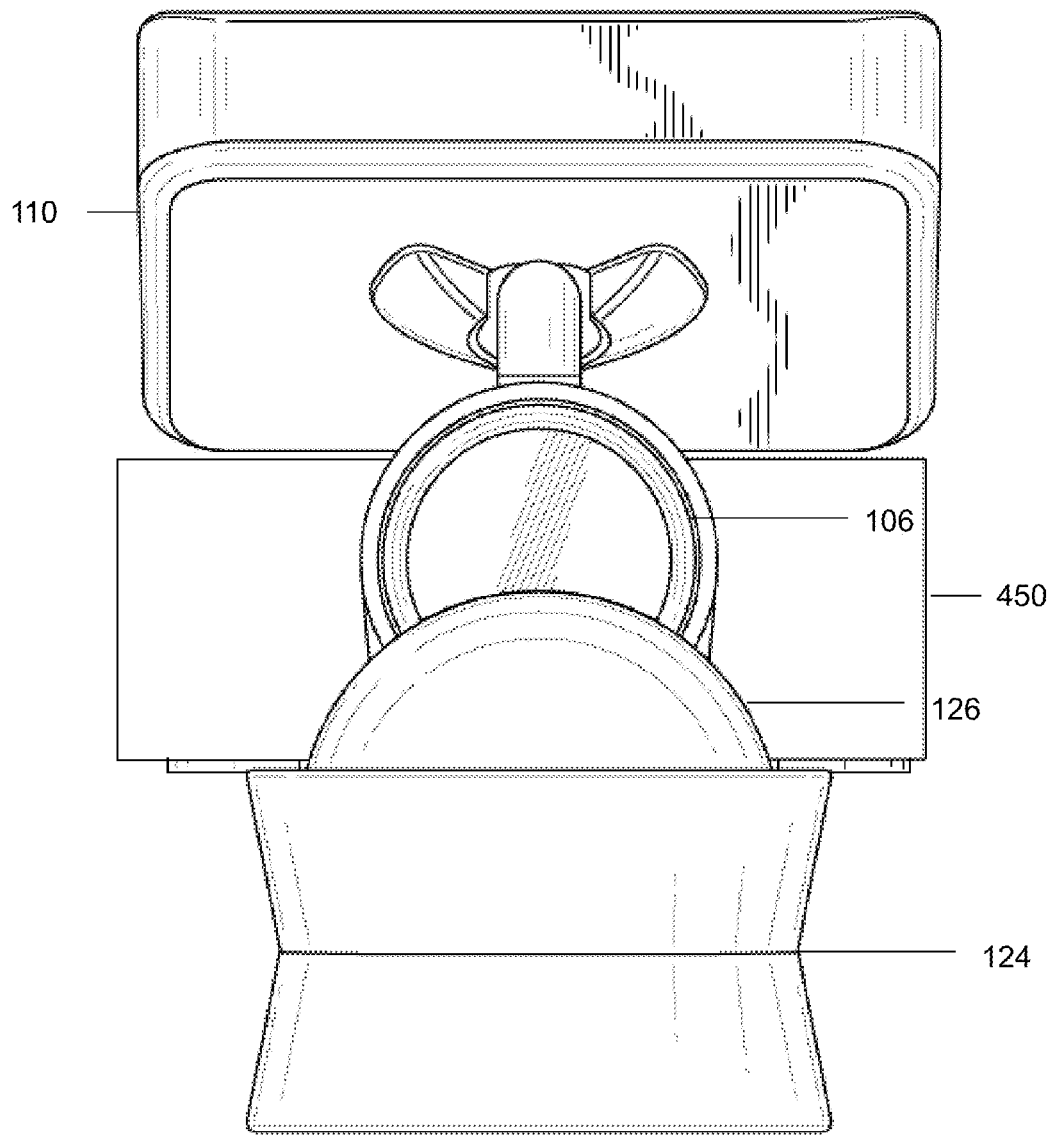
FIG. 4F illustrates a bottom view of the retrieving device of FIG. 4A.
Figure 4G:
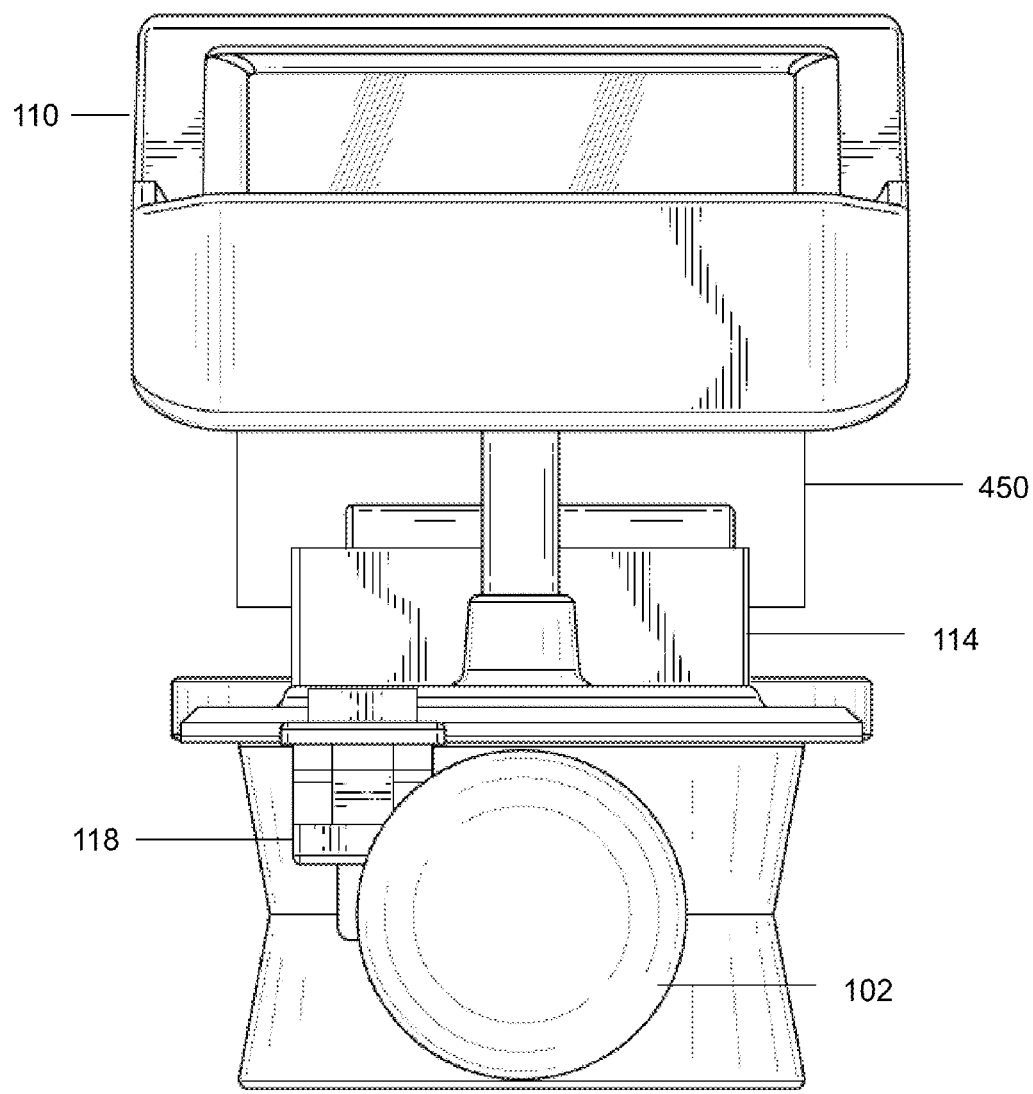
FIG. 4G illustrates a top view of the retrieving device of FIG. 4A.
Figure 5A:
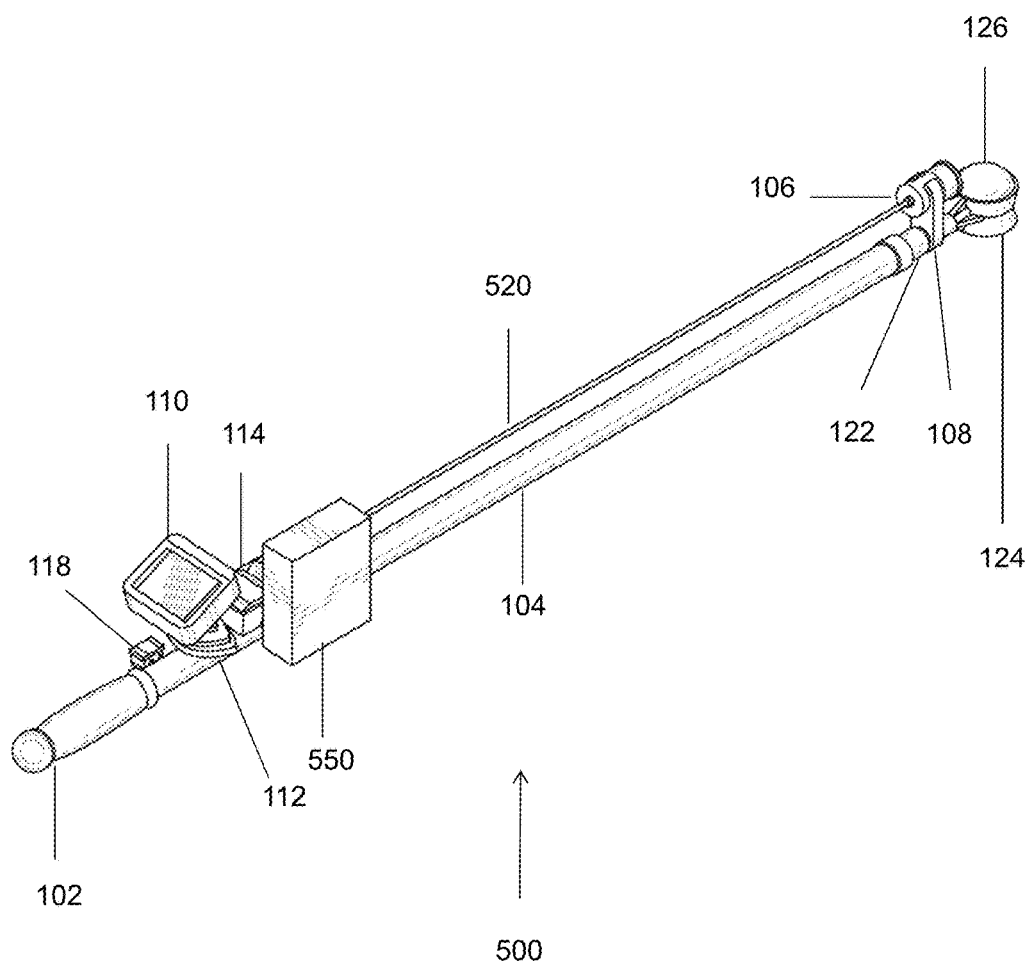
FIG. 5A illustrates an isometric view of a retrieving device including a tension device for providing tension to a wire of the retrieving device according to an embodiment.
Figure 5B:
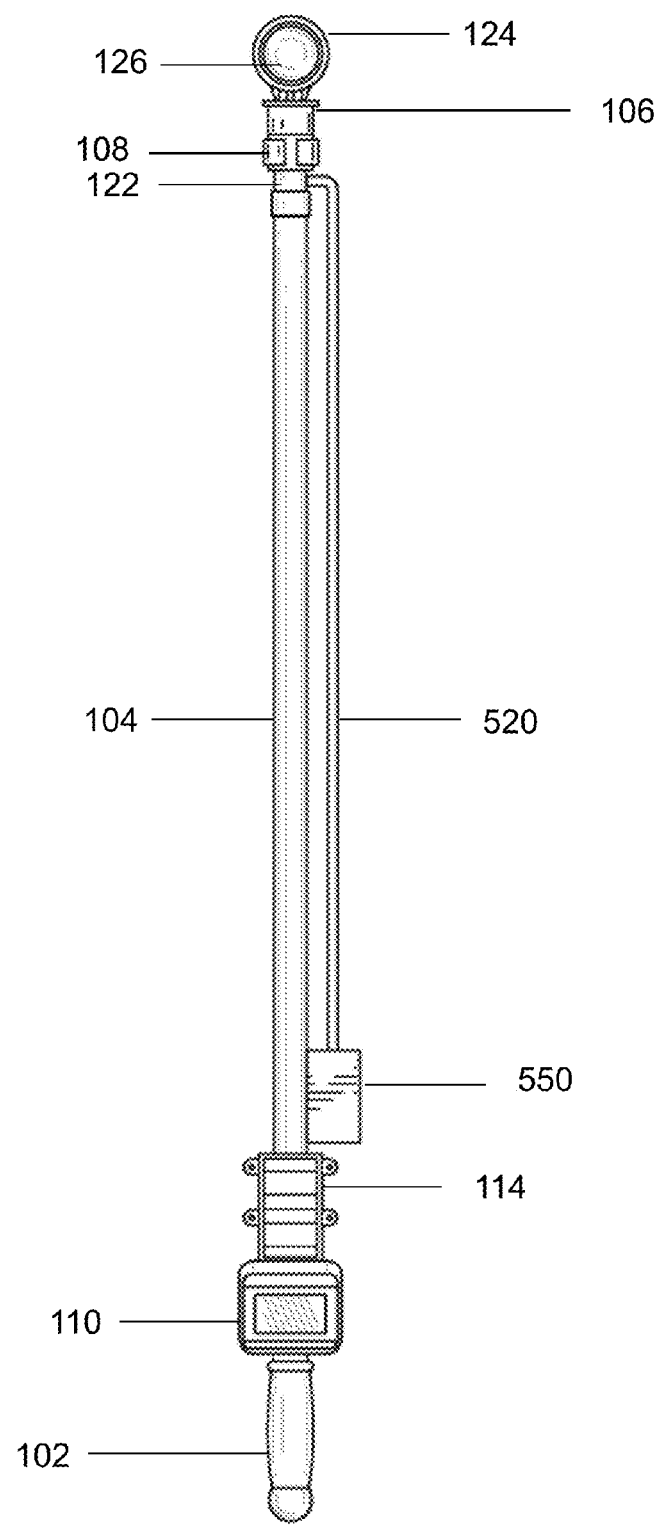
FIG. 5B illustrates a front view of the retrieving device of FIG. 5A.
Figure 5C:
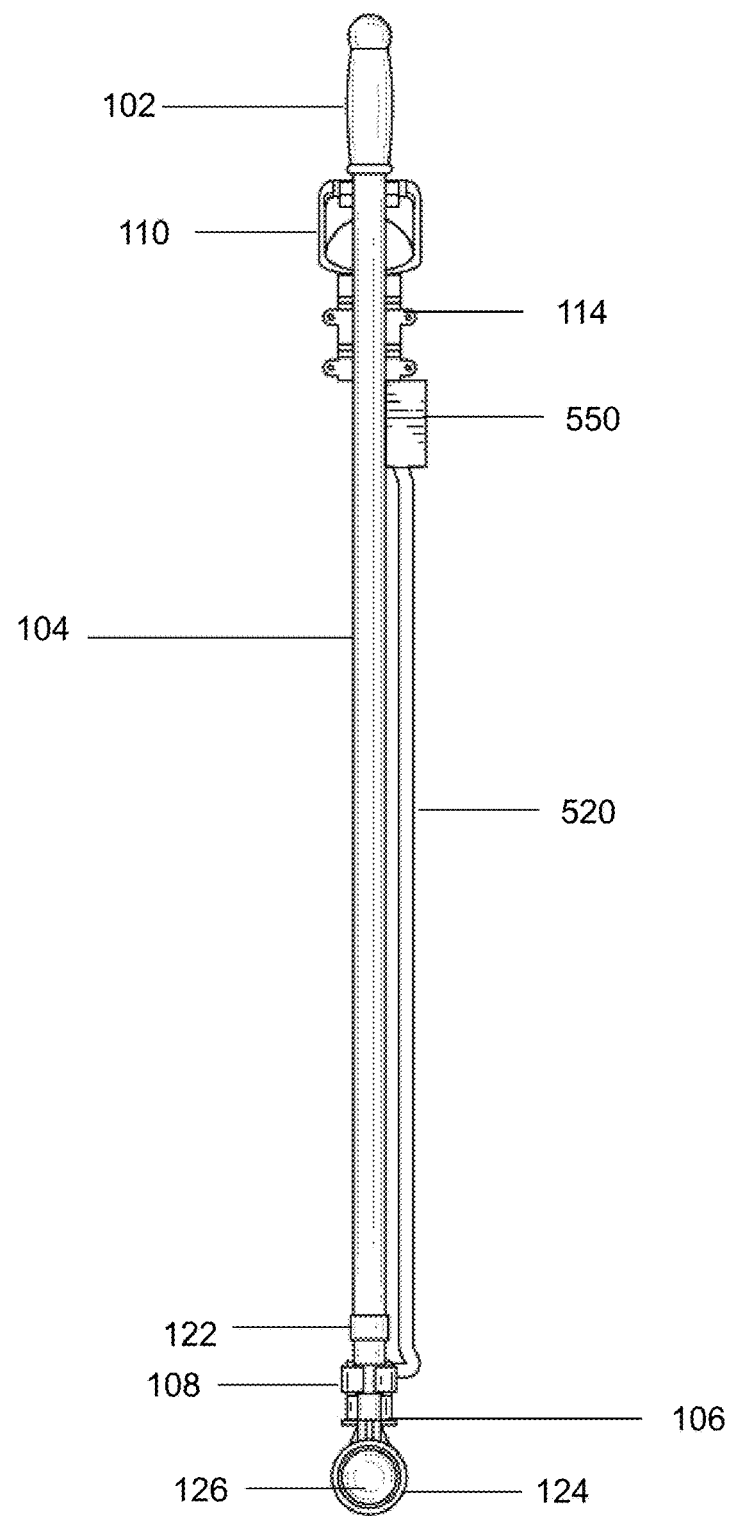
FIG. 5C illustrates a back view of the retrieving device of FIG. 5A.
Figure 5D:
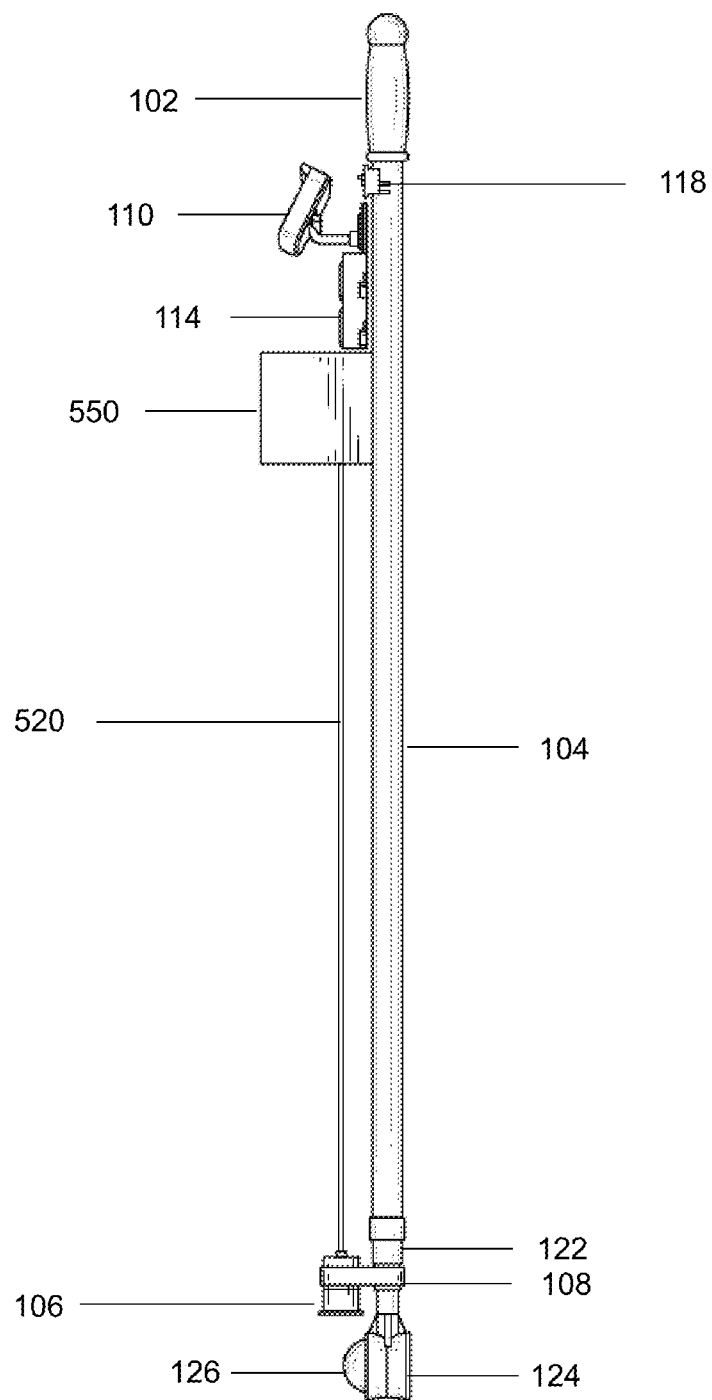
FIG. 5D illustrates a left side view of the retrieving device of FIG. 5A.
Figure 5E:
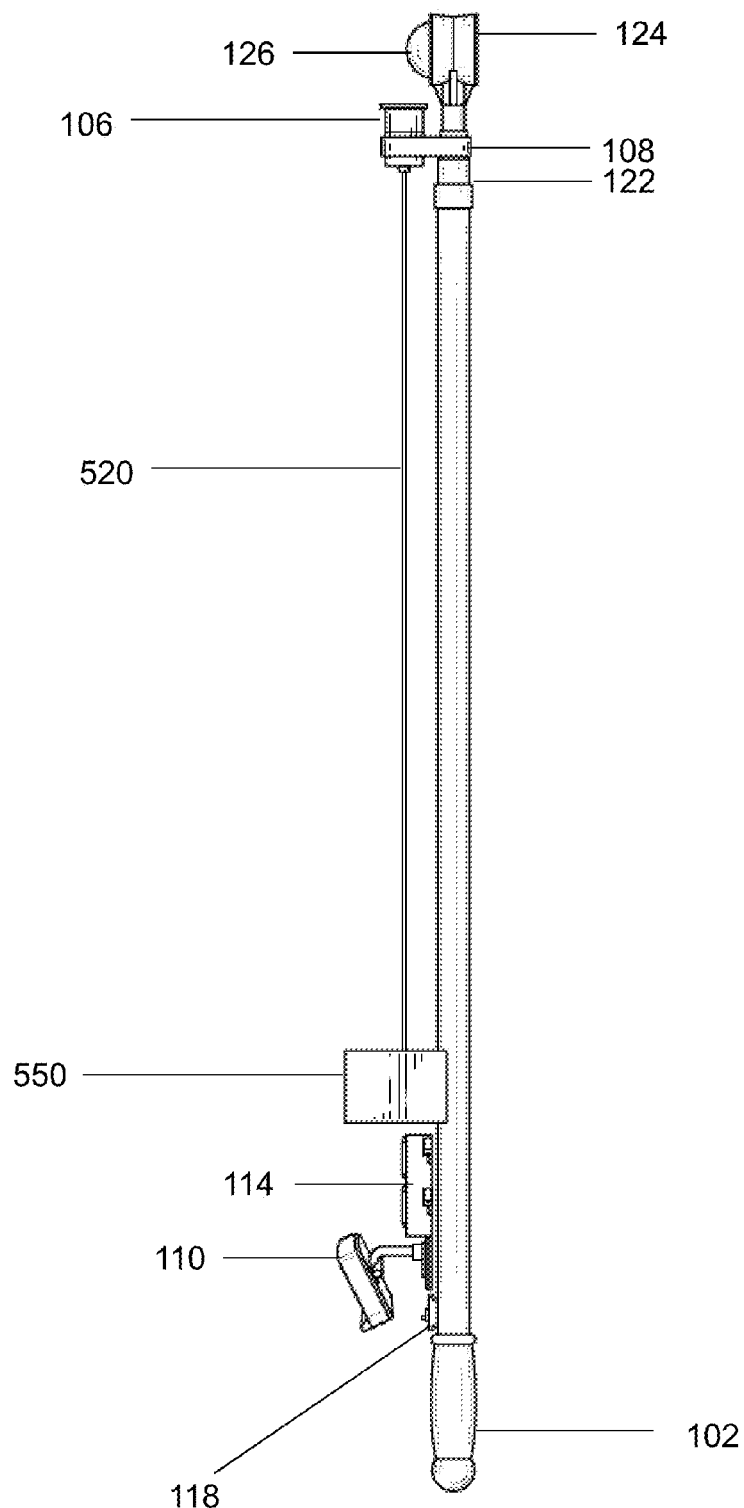
FIG. 5E illustrates a right side view of the retrieving device of FIG. 5A.
Figure 5F:
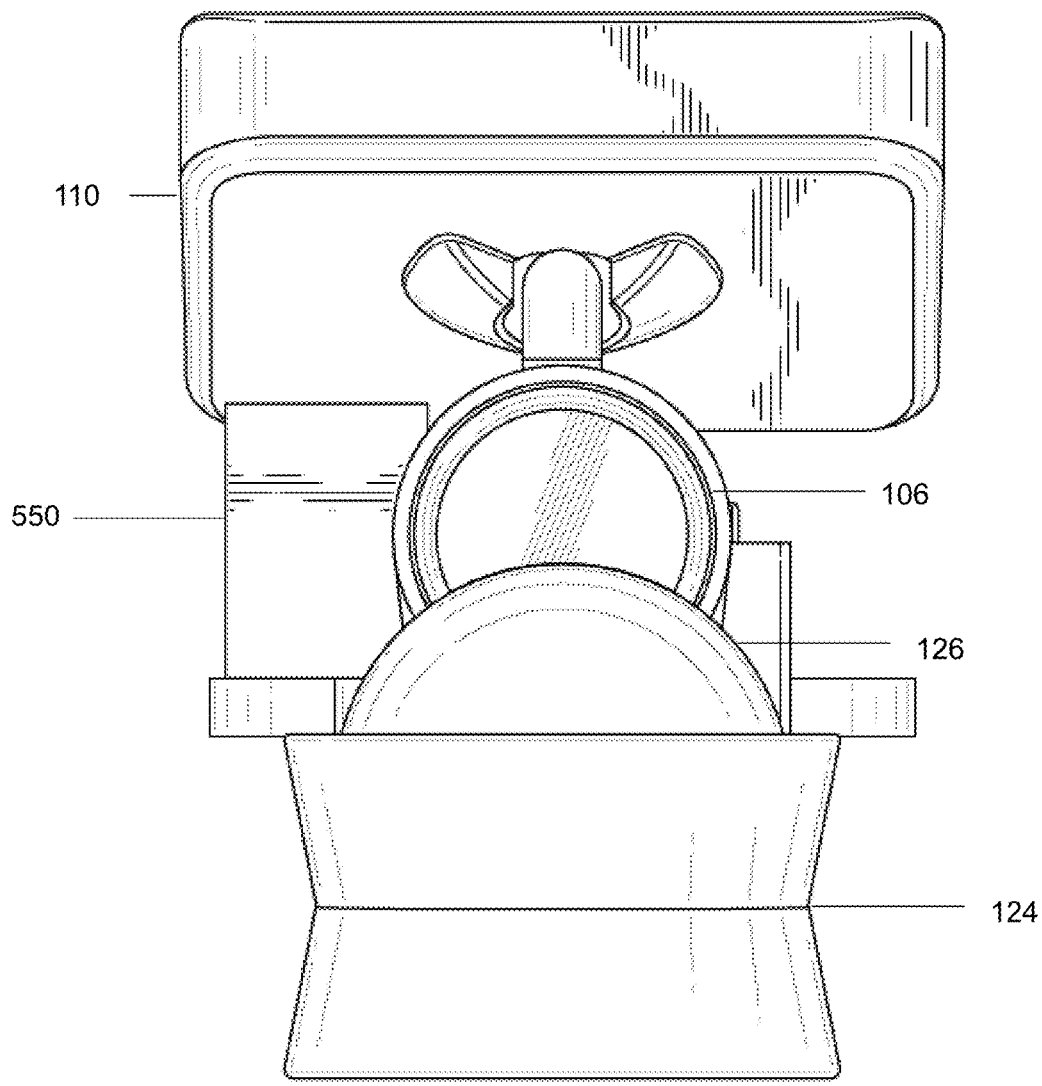
FIG. 5F illustrates a bottom view of the retrieving device of FIG. 5A.
Figure 5G:
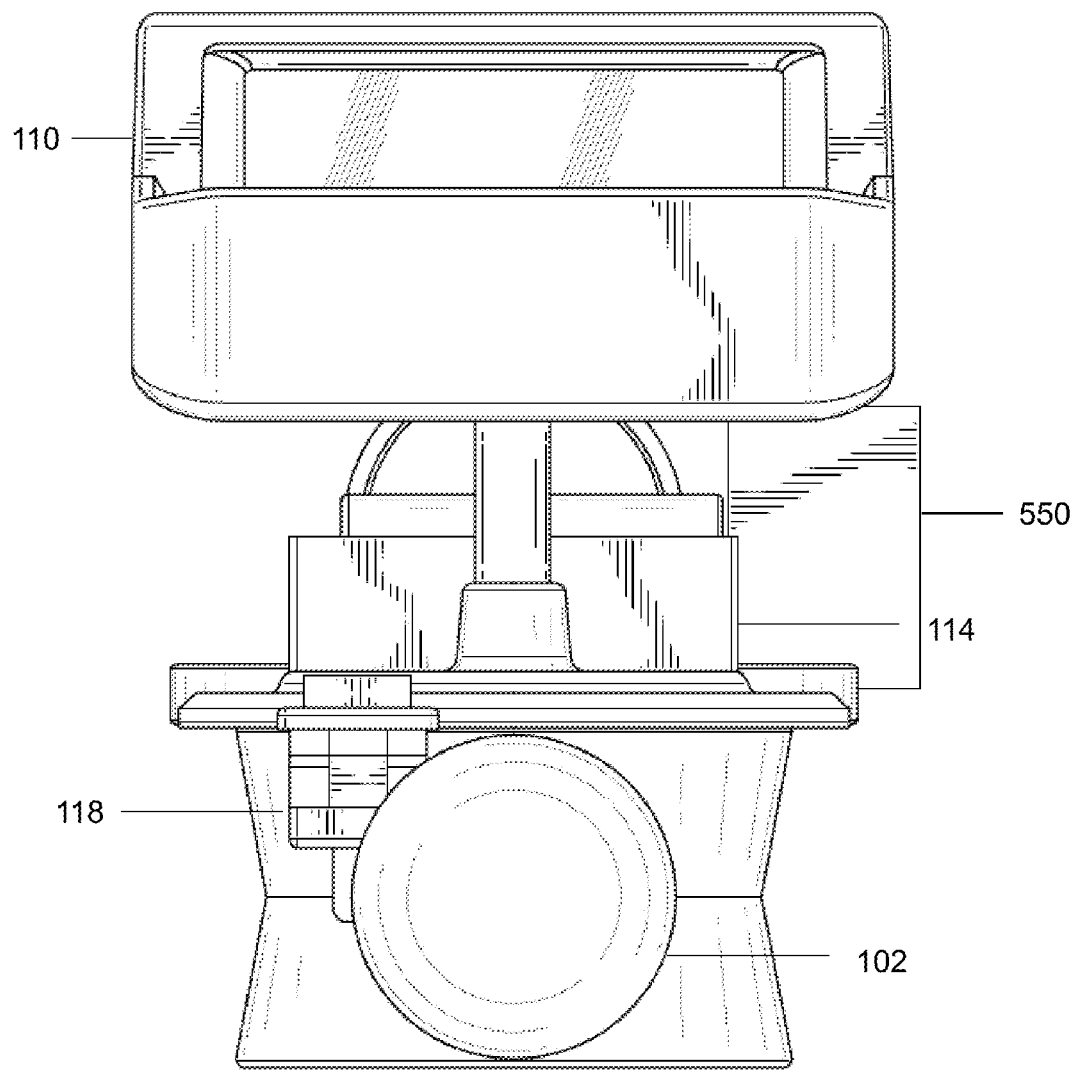
FIG. 5G illustrates a top view of the retrieving device of FIG. 5A.

The exemplary embodiments of the present disclosure are described with respect to retrieving devices and methods for retrieving objects using retrieving devices. In an embodiment, a retrieving device for retrieving an object according to the present disclosure may include a retriever pole, which may include a portion that may be configured to telescope inwards and outwards so that the retrieving device may be lengthened or shortened accordingly. The retrieving device may include a scooping device that may be positioned and attached at an end of the retriever pole. Additionally, the retrieving device may include a camera that may be configured to record image data of an area within a viewing range of the camera and image data associated with the object. A user carrying the retrieving device may utilize the camera to record image data as he or she walks and searches for the object in a particular area. When the user finally sees the object in a monitor of the retrieving device, the user may use the scooping device to retrieve the object. The retrieving device does not necessarily need the scooping device and may be simply used as a monitoring device as well.

Referring to the drawings and in particular to FIGS. 1A-1H, an embodiment of a retrieving device 100 is schematically illustrated. In FIGS. 1A-1H, the retrieving device 100 is illustratively shown to have a particular structure, however, other alternative structures, such as those described below or otherwise, may also be utilized. The retrieving device 100 may include components such as, but not limited to, a handle 102, a retriever pole 104, a camera 106, a monitor 110, a power source 114, a power switch 118, an electrical wire 120, and a scooping device 124. The retrieving device 100 may also include electronic processors and computer memories for performing a variety of the operative functions described herein. Additionally, any combination of the camera 106, the monitor 110, the power source 114, the power switch 118, and the electrical wire 120 may be removed from the retriever pole 104 as a unit and reattached to any other retriever pole or any other suitable device. Furthermore, the retrieving device 100 may be utilized on land, in dense vegetation, under water, or in any other area.

The retriever pole 104 of the retrieving device 100 may include the handle 102, which may be located at a proximal end of the retriever pole 104 and the scooping device 124, which may be located at a distal end of the retrieving device 100. In an embodiment, the handle 102 may be attached to or removed from an attachment point located at the proximal end of the retriever pole 104. If the handle 102 is removed from the attachment point at the proximal end, a different handle or another attachment may be attached at the attachment point if a user so desires. Similarly, the scooping device 124 may be attached to or removed from an attachment point located at the distal end of the retriever pole 104. The user may attach various different types of scooping devices or even entirely different attachments at the attachment point located at the distal end of the retriever pole 104. Other attachments that may be attached at the distal end of the retriever pole 104 include, but are not limited to including, a camera, a memory device, a storage device, scooping devices of different shapes and sizes, a power source, and sensors that may detect shape, light, or motion. The retriever pole 104 may come in various lengths and widths and may also have a telescoping portion 122, which the user may stretch out to increase the length of the retriever pole 104 or retract to decrease the length of the retriever pole 104. In an embodiment, the retriever pole 104 may have a length of 5 feet to 18 feet or more. Illustratively, the telescoping portion 122 is shown in FIGS. 1A-1H near the distal end of the retriever pole 104, however, other locations are also contemplated for the telescoping portion 122.

With regard to the camera 106 of the retrieving device 100, the camera 106 may be secured to the retrieving device 100 by utilizing a clamp 108, a mounting bracket, or any other device that may be utilized to attach the camera 106 to the retrieving device 100. The camera 106 may be configured to record images in black and white and/or in color. Also, the camera 106 may be configured to record image data of an area within a viewing range of the camera 106 and image data associated with the object 126. The image data may include image information associated with the area or the object 126 and may be in the form of photographs, video, and/or raw image data. The image data may be stored in a memory device of the camera 106 or in another storage device connectable to the camera 106. The user may be given the option of deleting the image data as well. Once the camera 106 is recording the image data, the image data may be sent to the monitor 110 for display. In an embodiment, the camera 106 may have a viewable range of at least 25 to 30 feet, however, other viewing ranges are also contemplated. The camera 106 may receive electrical power from power source 114 and may be switched on by power switch 118, however, in an embodiment, the camera 160 may have its own power source and its own power switch as well.

The monitor 110 of the retrieving device 100 may be configured to display the image data of the area and the image data associated with the object 126 that is captured by the camera 106. Additionally, the monitor 110 may be attached to the retriever pole 104 using a clamp 112, mounting bracket, or other attachment means. The monitor 110 may be electrically coupled to the camera 106 via electrical wire 120. In an embodiment, the monitor 110 may include buttons that may allow the user to select various options such as, but not limited to, brightness, contrast, black and white display, or color display. However, in another embodiment, the monitor 110 may also include a touch screen, which may allow the user to select the various options presented herein. Additionally, the user may be allowed to select a photograph mode so that monitor 110 displays photographs that the camera 106 may take. Similarly, the user may be allowed to select a video mode, which allows the monitor 110 to display streaming or recorded video that the camera 106 captures and transmits to the monitor 110. Additionally, the monitor 110 may include a memory device for storing the image data so that the user may view the image data on the monitor 110 at any time. The user may be provided the option of deleting the data at the monitor 110 as well. Furthermore, the monitor 110 may be powered using power source 114 and may be switched on using power switch 118, however, in one embodiment, the monitor 110 may have its own separate power source and power switch.

The power source 114 of the retrieving device 100 may be utilized to provide power to the various components of the retrieving device 100 such as the camera 106 and the monitor 110. The power switch 118 may be utilized to activate and deactivate the power source 114. In an embodiment, the power source 114 may be a battery pack as illustratively shown, however, the power source 114 may also be a solar power source, an A/C adaptor, or other power source. The power source 114 may be attached to the retriever pole 104 by utilizing a clamp 116, mounting bracket, or other attachment means.

The electrical wire 120 of the retrieving device 100 may be utilized to connect the camera 106, the monitor 110, the power source 114, and the power switch 118 together. The electrical wire 120 may be insulated and may allow the power generated by the power source 114 to flow through the components and allow signals to be transmitted between the components as well. As illustratively shown, the electrical wire 120 may be configured to wrap around a portion of the retriever pole 104 that lies between the monitor 110 and the camera 106. When the telescoping portion 122 is extended out, the electrical wire 120 may be configured to extend with the telescoping portion 122. Similarly, when the telescoping portion 122 is retracted, the electrical wire 120 may be configured to retract to its original position and form. In an embodiment, the electrical wire 120 may not have to be wrapped around the retriever pole 104, but instead, may be attached to the retriever pole 104 with a clamp or other device.

The scooping device 124 of the retrieving device 100 may be utilized to retrieve the object 126, which may be any kind of object. In an embodiment, the scooping device 124 may be a scoop designed to retrieve an object such as a golf ball and may be configured to retrieve the object 126 by positioning the scooping device 124 directly over the object 126 so that the object 126 lies within the scoop portion of the scooping device 124. As described herein, any number or type of scooping devices may be utilized with the retrieving device 100 and may be attached to the retriever pole 104 at an attachment point of the retrieving device 100. For example, the scooping device 124 may be a scoop, a net, a grabbing device with a pair of mechanical arms for latching onto the object 126, or any other type of device capable of holding onto an object 126.

In an embodiment, the retrieving device 100 may include a separate memory card or universal serial bus device, which may connect to the camera 106 and/or the monitor 110 so that stored image data may be transferred to the memory card or universal serial bus device. If the user records image data such as video or photographs, the user can download the image data to the memory card or the universal serial bus device. Once the image data is downloaded, the user may insert the memory card or the universal serial device on a personal computer and view the image data on the personal computer whenever the user wants. For example, for the marine industry, an official can take video and images of an inspection of a ship's hull and the official can then transfer the content to a personal computer for viewing at a later time. Similarly, a golfer can use the image data to view golf balls or other objects at his or her personal computer at their leisure.

In an embodiment, the retrieving device 100 may include one or more wired or wireless sensors, which may be incorporated into the monitor 110, the camera 106, or on other locations of the retrieving device 100. The sensors may be configured to detect a shape of the object 126. The shape may be a predetermined shape or a shape that the user decides to select. In an embodiment, when the sensors detect the desired shape of the object 126, the sensor may be configured to transmit an audio signal, a visual signal, or both an audio and visual signal and be configured to cause the signals to be emitted via the monitor 110, the camera 106, and/or through a separate speaker device. For example, if the sensor detects a golf ball, the sensor may cause an audio tone to be played so that the user may be alerted to the presence of the golf ball in the vicinity of the golfer. Similarly, if the sensor detects the golf ball, the sensor may cause a light to flash on the monitor 110 or on another location of the retrieving device 100 so that the golfer knows that the golf ball is close by.

In one embodiment, the sensor may be configured to detect reflections of light reflecting off of the object 126 or a color of the object 126. If the sensor detects the reflections of light and/or the color of the object 126, the sensor may cause an audio or visual signal to be emitted as well. In another embodiment, the sensor may be configured to transmit an audio signal or a visual signal of increasing intensity as the retriever device 100 gets closer to the object 126. Similarly, the sensor may be configured to transmit an audio signal or a visual signal of decreasing intensity as the retriever device gets farther away from the object. For example, in an embodiment, the retrieving device 100 may be configured to provide alarm sounds similar to those provided by a metal detector, which may notify a user as he or she is getting closer or farther away from a metal object detected by the metal detector. In an embodiment, the sensor may be configured to give voice commands to the user to tell the user to slow down, walk in a certain direction, or instruct the user that the object 126 is within a certain vicinity.

In an embodiment, the retrieving device 100 may also include a light, which may assist an individual in locating an object 126 at night or in dark areas such as underwater or in dense vegetation. The light may be positioned anywhere on the retriever pole 104 or on any of the other components of the retrieving device 100.

Operatively, the retrieving device 100 may operate, in one embodiment, as follows: A user who is playing golf may strike a golf ball with his golf club and the golf ball may fall into a lake on the golf course. At this point, the user may open up his golf bag and take out a unit including the camera 106, the monitor 110, the power switch 118, the power source 114, and the electrical wire 120. The user may create the retrieving device 100 by attaching the unit to a retriever pole 104 that includes the handle 102, a telescoping portion 122, and a scooping device 124. At this point, the user can turn on the retrieving device using power switch 118 and use the retrieving device 100 to search for the lost golf ball. As the user is walking towards the lake, the camera 106 can record image data, which can be stored and/or sent to the monitor 110 for viewing. The user can view the image data on the monitor 110 and eventually may see the golf ball on the monitor when the user puts the retriever device 100 in the water of the lake. A light attached at the end of the retrieving device may allow the user to easily view the golf ball on the monitor, particularly if the camera 106 or the user is in a dark location. Once the location of the golf ball is determined, the user can extend out the telescoping portion 122 if necessary and scoop up the golf ball using the scooping device 124 of the retrieving device 100.

If, for example, the user does not know where the golf ball is after he hits the golf ball, the user may utilize the sensors to assist the user in locating the golf ball. The sensors may indicate that an object having the golf ball's shape or color is in the vicinity. As the user walks closer to the golf ball, the sensors may emit an alarm sound or cause a light to be displayed with increasing intensity to indicate that the user is getting closer to the golf ball. Similarly, if the user starts walking in the wrong direction, the alarm sound and/or light may decrease in intensity to indicate that the user is getting farther away from the golf ball. In one embodiment, if the user loses the golf ball at night and does not want to go into a particular area at night, the user may record the image data in a memory device so that the user can view the contents of the memory device at home. The next day the user may go out and locate the golf ball after having viewed the image data on the memory device. In another embodiment, if the user locates the golf ball, but is unable to retrieve it because the retriever pole 104 is too small or too large, the user can detach the unit and reattach it to another pole or another device so that the golf ball may be retrieved. In an embodiment, the user may utilize the retrieving device to retrieve any type of object.

Referring to the drawings and in particular to FIGS. 2A-2G, a retrieving device 200 is schematically illustrated. The retrieving device 200 may include a handle 102, a retriever pole 104, a telescoping portion 122, and a scooping device 124 that may be utilized to retrieve an object 126. The retrieving device 200 may also include the components as utilized in retriever device 100, however, retrieving device 200 may include a different camera 206, monitor 210, power source 214, and power switch 218. The camera 206, monitor 210, power source 214, and the power switch 218 may be different from the corresponding components from retrieving device 100 in that instead of being detachable from the retrieving device 200, these components may be fixed onto the retrieving device 200. Additionally, in an embodiment, the electrical wire 120 may be housed within the retriever pole 104 so that none of the electrical wire 120 is exposed. Operatively, the retrieving device 200 may otherwise incorporate similar functionality as the other retrieving devices disclosed herein.

Referring to the drawings and in particular to FIGS. 3A-3G, a retrieving device 300 is schematically illustrated. The retrieving device 300 may include a handle 102, a retriever pole 104, clamps 108, 112, and 116, a telescoping portion 122, and a scooping device 124 that may be utilized to retrieve an object 126. The retrieving device 300 may also include the components as utilized in retrieving device 100, however, retrieving device 300 may include a different camera 306, monitor 310, power source 314, and power switch 318. In this embodiment, the camera 306 and the monitor 310 may be configured to be wireless and, as a result, do not require the electrical wire 120. As an example, the devices in the retrieving device 300 may be configured to communicate and transmit signals to each other using any suitable wireless protocols and technology standards. In an embodiment, the camera 306 and the monitor 310 may each have their own power sources 314 and may have their own corresponding switches 318 as well. In one embodiment, the camera 306 and the monitor 310 may have a working range of 25 feet to 30 feet. Having such a working range may allow the retrieving device 300 to require less powerful wireless sensors. The components of retrieving device 300 do not have to be fixed and may be attached to any type of retriever pole or other device. Operatively, the retrieving device 300 may incorporate similar functionality as the other retrieving devices disclosed herein, however, may use wireless technology instead of wired technology.

Referring to the drawings and in particular to FIGS. 4A-4G, a retrieving device 400 is schematically illustrated. The retrieving device 400 may include a handle 102, a retriever pole 104, camera 106, clamps 108, 112, and 116, power source 114, monitor 110, a telescoping portion 122, and a scooping device 124 that may be utilized to retrieve an object 126. In this embodiment, the retrieving device 400 may include the electrical wire 120, however, instead of wrapping the electrical wire 120 around a portion of the retriever pole 104 as done with retrieving device 100, the electrical wire 120 may be housed within a rack 450 that may be attached to the retriever pole 104. The rack 450 may secure the electrical wire 120 and may protect the wires from getting entangled or cut. Additionally, the rack 450 may allow the electrical wire 120 to extend out and retract in when the telescoping portion 122 is extended out or retracted respectively. Each of the components in retrieving device 400 may be either detachable from the retriever pole 104 and may be fixed onto the retriever pole 104. Operatively, the retrieving device 400 may otherwise incorporate similar functionality as the other retrieving devices disclosed herein.

Referring to the drawings and in particular to FIGS. 5A-5G, a retrieving device 500 is schematically illustrated. The retrieving device 500 may include a handle 102, a retriever pole 104, camera 106, clamps 108, 112, and 116, power source 114, monitor 110, a telescoping portion 122, and a scooping device 124 that may be utilized to retrieve an object 126. In this embodiment, the retrieving device 500 may include a tension device 550. The tension device 550 may be configured to keep tension on the insulated electrical wire 520 so that the electrical wire 520 does not get entangled or have too much slack. Additionally, the tension device 550 may allow the electrical wire 520 to extend when the telescoping portion 122 is extended or retract when the telescoping portion 122 is retracted. When the electrical wire 520 is extended or retracted, the tension device 550 may keep tension on the electrical wire 520 so that there is not too much slack. In an embodiment, the user may operate the tension device 550 similarly to tension devices used for window blind systems. The user may gently pull down on the electrical wire 520 to cause the electrical wire 520 to retract and spool within the tension device 550. Similarly, the user may pull out the electrical wire 520 from the tension device 550 so that the length of the wire exposed outside the tension device 550 is increased. Each of the components in retrieving device 500 may be either detachable from the retriever pole 104 and may be fixed onto the retriever pole 104. Operatively, the retrieving device 500 may otherwise incorporate similar functionality as the other retrieving devices disclosed herein.

The retrieving devices disclosed herein may be provided as a kit. The kit may separately include the handle 102, the retriever pole 104, the camera 106, the clamps 108, 112, and 116, monitor 110, the power source 114, the power switch 118, the electrical wire 120, the telescoping portion 122, and the scooping device 124. Additionally, a kit may also include camera 206, monitor 210, power source 214, and power switch 218. Another kit may include camera 306, monitor 310, power source 314, and power switch 318. Yet another kit may include rack 450. Still another kit may include tension device 550. Each of the kits disclosed herein may include any of the components described in this disclosure and may include instructions for assembling and using the retrieving devices.

Notably, the features of the retrieving devices described herein can be combined or otherwise associated with the other devices described above and/or the methods described below.

Figure 6:
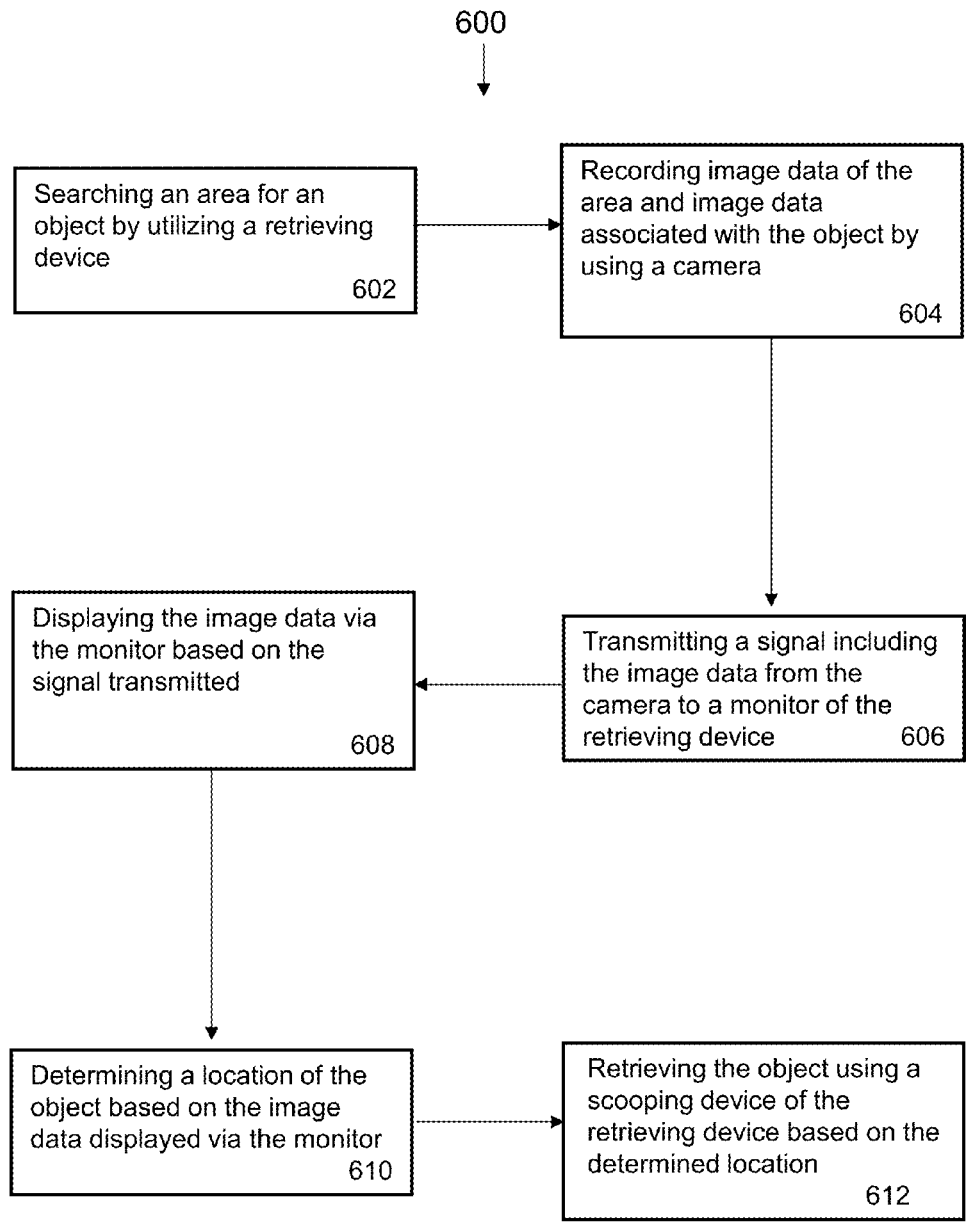
FIG. 6 illustrates an embodiment of a method for retrieving an object using a retrieving device according to an embodiment.

Referring now to FIG. 6, an illustrative method 600 for retrieving an object by utilizing a retrieving device is schematically illustrated. Notably, the method 600 is not intended to be limited to the devices and components described above or illustrated in the drawings. The method 600 may begin with step 602, which may include searching an area for an object by utilizing a retrieving device. The retrieving device may include a scooping device configured to retrieve the object when the scooping device is positioned over the object. At step 604, the method 600 may include recording image data of the area and image data associated with the object by utilizing a camera of the retrieving device. In an embodiment, the camera may store the recorded image data in a memory device of the camera. The method 600 may then include transmitting a signal including the image data of the area and the image data associated with the object from the camera to a monitor of the retrieving device at step 606. The image data may be photographs, video, or even raw image data that may be processed by the monitor.

At step 608, the method 600 may include displaying the image data of the area and the image data associated with the object via the monitor based on the signal that is received from the camera. Additionally, the method 600 may include determining a location of the object based on the image data of the area and the image data associated with the object that is displayed on the monitor at step 610. Furthermore, the method 600, at step 612, may include retrieving the object by utilizing the scooping device after determining the location of the object.

In an embodiment, the method 600 may include detecting a shape of the object by utilizing a sensor electrically coupled to the monitor and the camera. The sensor may cause an audio signal and/or a visual signal to be emitted when the shape of the object is detected by the sensor. In another embodiment, the method 600 may include detecting reflections of light reflecting off of the object by utilizing the sensor. Similarly, the sensor can cause an audio signal and/or a visual signal to be emitted when the reflections of light are detected by the sensor. In one embodiment, the method 600 may include emitting an audio signal and/or a visual signal that may increase in intensity as the retrieving device gets closer to the object. In another embodiment, the method 600 may include emitting an audio signal and/or a visual signal that decreases in intensity as the retrieving device moves farther away from the object.

In an embodiment, the method 600 may include detaching the camera, the monitor, and an electrical wire coupling the camera to the monitor from the retrieving device, and reattaching the camera, the monitor and the electrical wire to a different retrieving device. In still another embodiment, the method 600 may include extending the retriever pole of the retrieving device to increase the length of the retrieving device and retracting the retriever pole of the retrieving device to decrease the length of the retrieving device. In yet another embodiment, the method 600 may include storing the image data of the area and the image data associated with the object in a computer memory of the retrieving device. Notably, the method 600 may incorporate any of the functionality, components, or features described for the various retrieving devices described above and is not intended to be limited to the description above.

Upon reviewing the aforementioned embodiments, it would be evident to an artisan with ordinary skill in the art that said embodiments can be modified, reduced, or enhanced without departing from the scope and spirit of the claims described below.

At least a portion of the methodologies and techniques described with respect to the exemplary embodiments can incorporate a machine or other computing device within which a set of instructions, when executed, may cause the machine to perform any one or more of the methodologies or functions discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard), a cursor control device (e.g., a mouse), a disk drive unit, a signal generation device (e.g., a speaker or remote control) and a network interface device.

The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

What is claimed is:

1. A method for retrieving an object using a retrieving device, the method comprising:

searching an area for the object by utilizing the retrieving device, wherein the retrieving device comprises an extendable retriever pole including a scooping device positioned at a distal end of the extendable retriever pole, wherein the scooping device is configured to retrieve the object when the scooping device is positioned over the object;

recording image data of the area and image data associated with the object by utilizing a camera positioned near the distal end of the extendable retriever pole of the retrieving device;

providing electrical power to the camera from a power source of the retrieving device, wherein the power source is attached to the retriever pole and is attached to the retriever pole at a location separate from a monitor of the retrieving device positioned near the proximal end of the extendable retriever pole of the retrieving device, wherein the power source is attached to an outside surface of the retriever pole in proximity to the proximal end of the retriever pole, wherein the monitor and the power source are positioned in proximity to each other on the proximal end of the retriever pole;

transmitting a signal including the image data of the area and the image data associated with the object from the camera to the monitor positioned near the proximal end of the extendable retriever pole of the retrieving device, wherein the monitor is wirelessly coupled to the camera;

displaying the image data of the area and the image data associated with the object via the monitor based on the signal;

determining a location of the object based on the image data of the area and the image data associated with the object that is displayed via the monitor;

retrieving the object using the scooping device after determining the location of the object; and detaching the camera, the monitor, and the power source as a removable unit, and further comprising reattaching the removable unit including the camera, the monitor, and the power source to a different retrieving device.

2. The method of claim 1, further comprising detecting a shape of the object by utilizing a sensor electrically coupled to the monitor and the camera, and further comprising causing one of an audio signal or a visual signal to be emitted when the shape of the object is detected.

3. The method of claim 1, further comprising detecting reflections of light reflecting off of the object by utilizing a sensor coupled to the monitor and the camera, and further comprising causing one of an audio signal or a visual signal to be emitted when the reflections of light are detected.

4. The method of claim 1, further comprising emitting one of an audio signal and a visual signal which increase in intensity as the retrieving device increases proximity to the object, and further comprising emitting one of an audio signal and a visual signal which decrease in intensity as the retrieving device increases distance from the object.

5. The method of claim 1, further comprising providing an option, via the monitor, to delete the image data.

6. The method of claim 1, further comprising extending the extendable retriever pole of the retrieving device to increase a length of the retrieving device, and further comprising retracting the extendable retriever pole of the retrieving device to decrease the length of the retrieving device.

7. The method of claim 1, further comprising storing the image data of the area and the image data associated with the object in a computer memory of at least one of the camera and the monitor.

8. The method of claim 1, further comprising detecting a shape of the object by utilizing a wireless sensor incorporated into at least one of the monitor, the camera, and the retriever pole.

9. The method of claim 8, further comprising detecting a reflection off of the object by utilizing the wireless sensor.

10. The method of claim 8, further comprising detecting a color of the object by utilizing the wireless sensor.

11. The method of claim 1, further comprising outputting at least one of an audio signal and a visual signal after a wireless sensor of the retrieving device detects at least one of a shape of the object, a color of the object, and a reflection coming off of the object.

* * * * *